United States Patent [19]

Cahlander et al.

[11] Patent Number: 5,249,914
[45] Date of Patent: Oct. 5, 1993

[54] FOOD TRANSPORT FIXTURE AND METHOD

[75] Inventors: Robert L. Cahlander, Red Wing; David W. Carroll, Cannon Falls; Gregory A. Lawrence, Red Wing, all of Minn.; John O. Reinertsen, Glen Ellyn, Ill.

[73] Assignee: Restaurant Technology, Inc., Oak Brook, Ill.

[21] Appl. No.: 863,631

[22] Filed: Apr. 6, 1992

Related U.S. Application Data

[63] Continuation of Ser. No. 519,520, May 4, 1990, abandoned.

[51] Int. Cl.⁵ .................. B65G 57/03; A47J 37/06
[52] U.S. Cl. .................. 414/793.4; 414/794.3; 99/386; 99/423; 99/443 C
[58] Field of Search .......... 414/416, 799, 794.3, 414/793.4, 751, 753, 797.9; 99/349, 373, 443 C, 386, 423; 901/16

[56] References Cited

U.S. PATENT DOCUMENTS

| | | | |
|---|---|---|---|
| 3,266,442 | 8/1966 | Udall et al. | |
| 3,377,963 | 4/1968 | Anderson et al. | |
| 3,413,911 | 12/1968 | Phelan et al. | 414/794.3 X |
| 3,557,682 | 1/1971 | Goosman | 99/423 X |
| 3,587,446 | 6/1971 | Gardner | 99/349 X |
| 3,965,807 | 6/1976 | Baker | 99/423 X |
| 3,987,718 | 10/1976 | Lang-Ree et al. | 99/386 |
| 4,071,149 | 1/1978 | Deguchi | 414/799 X |
| 4,213,380 | 7/1980 | Kahn | 99/349 |
| 4,281,594 | 8/1981 | Baker et al. | 99/386 |
| 4,339,220 | 7/1982 | Pulda | 414/794.3 X |
| 4,345,514 | 8/1982 | Morley | 99/349 |
| 4,396,336 | 8/1983 | Malomood | 414/797.9 X |
| 4,433,951 | 2/1984 | Koch et al. | 414/217 |
| 4,457,665 | 7/1984 | Fluck | 414/797.9 X |
| 4,567,819 | 2/1986 | Adamson | 99/349 |
| 4,657,466 | 4/1987 | Leeper et al. | 414/416 |
| 4,836,111 | 6/1989 | Kaufman | 901/16 X |

FOREIGN PATENT DOCUMENTS 221408  5/1987  France .................. 414/794.3

*Primary Examiner*—Michael S. Huppert
*Assistant Examiner*—Stephen T. Gordon
*Attorney, Agent, or Firm*—Jenner & Block

[57] ABSTRACT

A food transferring fixture is disclosed which can be used to transfer food items from one food preparation area to another. The fixture includes a hoop for surrounding items to be transferred and a spatula for scooping, supporting or depositing the items to be transferred. The hoop and spatula are mounted to a horizontally extendable frame for moving the spatula relative to the hoop. In other embodiments, one or more hoops and spatulas having a plurality of apertures arranged in a horizontal planar array are used to deposit food items in the array pattern and retrieve the items in the same pattern. After processing in some embodiments, a removably attached second subassembly may be used to transfer uncooked food to a cooking station. The uncooked food subassembly is then removed, and a first cooked food subassembly then retrieves the cooked food items. Additionally, a method for transporting food items which incorporates many of the above-listed features is also provided.

36 Claims, 18 Drawing Sheets

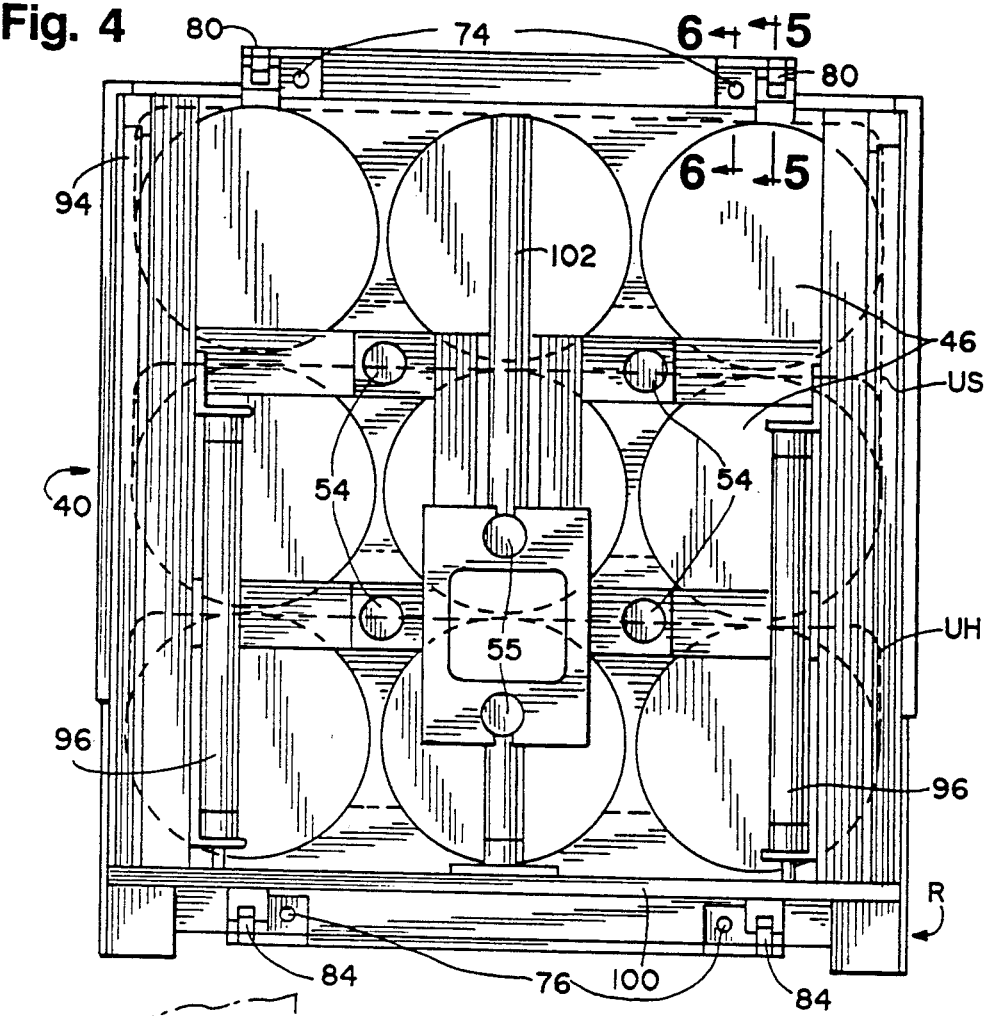
Fig. 4
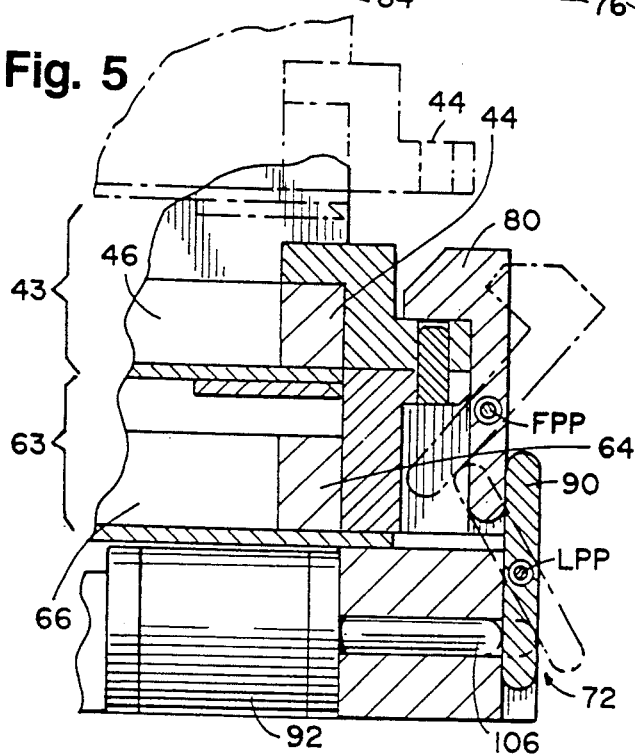
Fig. 5
Fig. 6

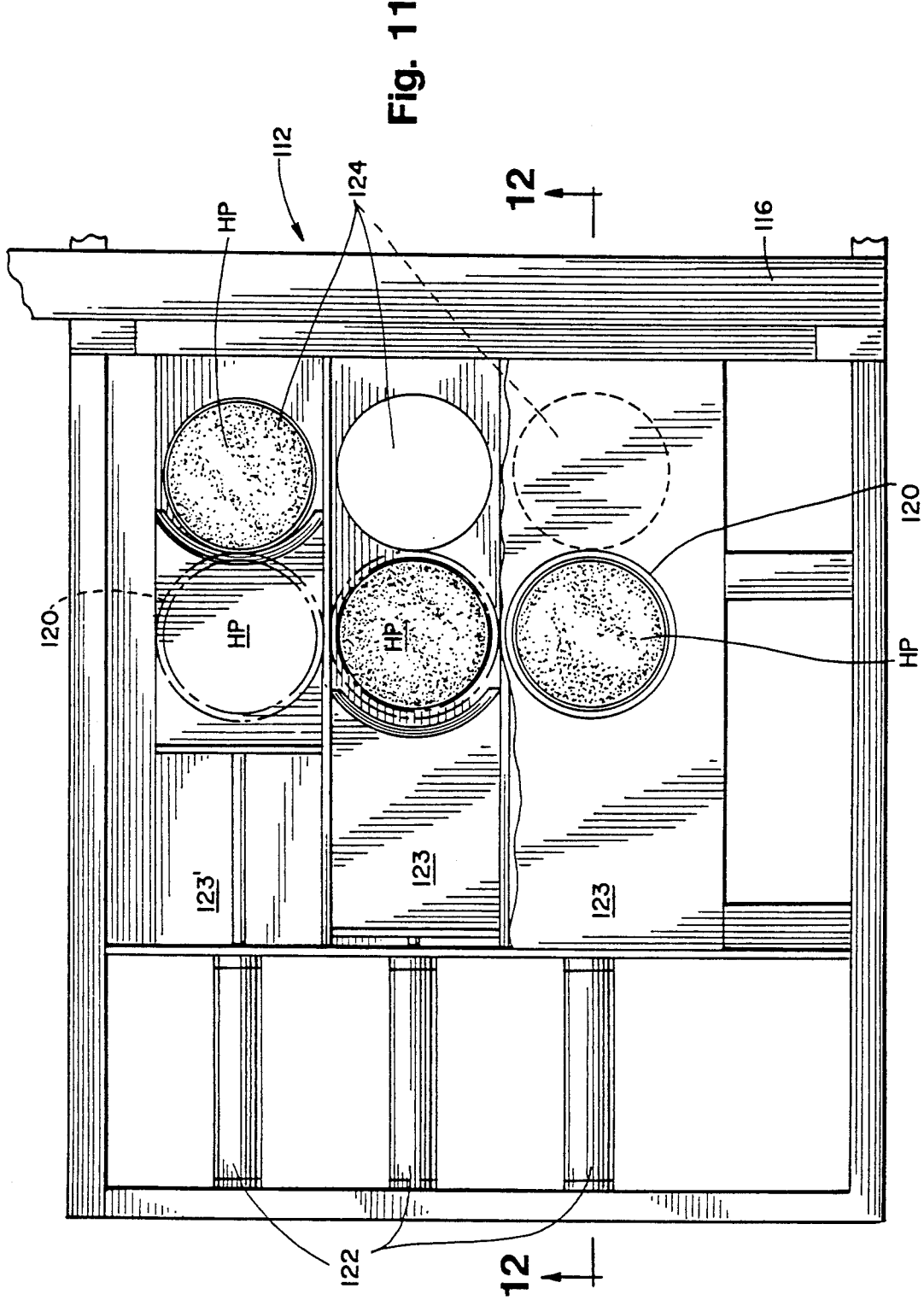

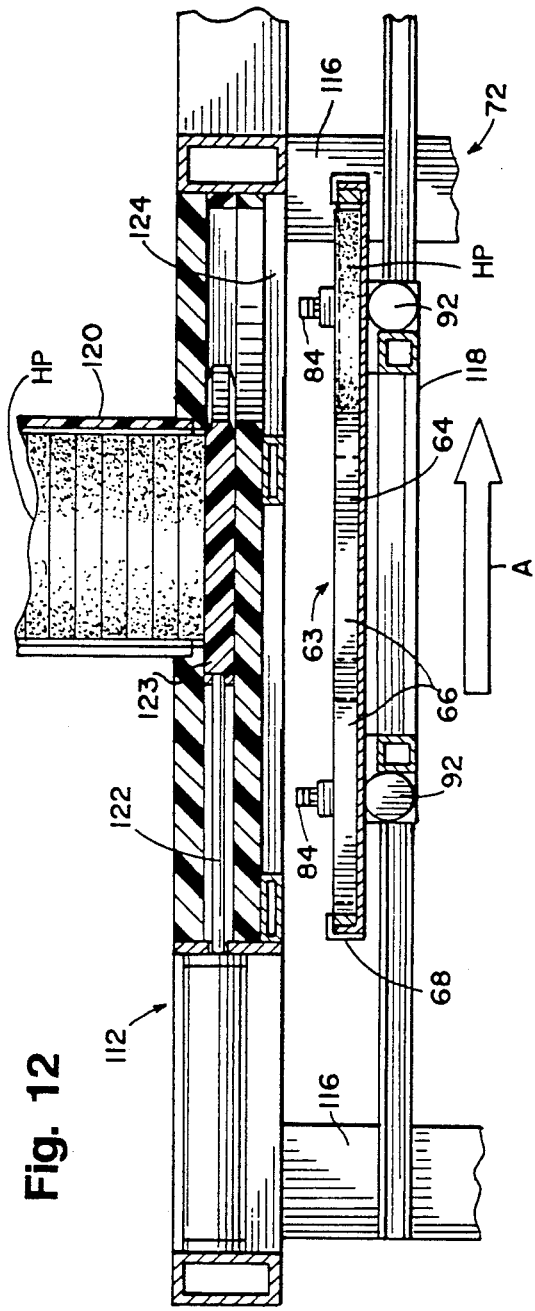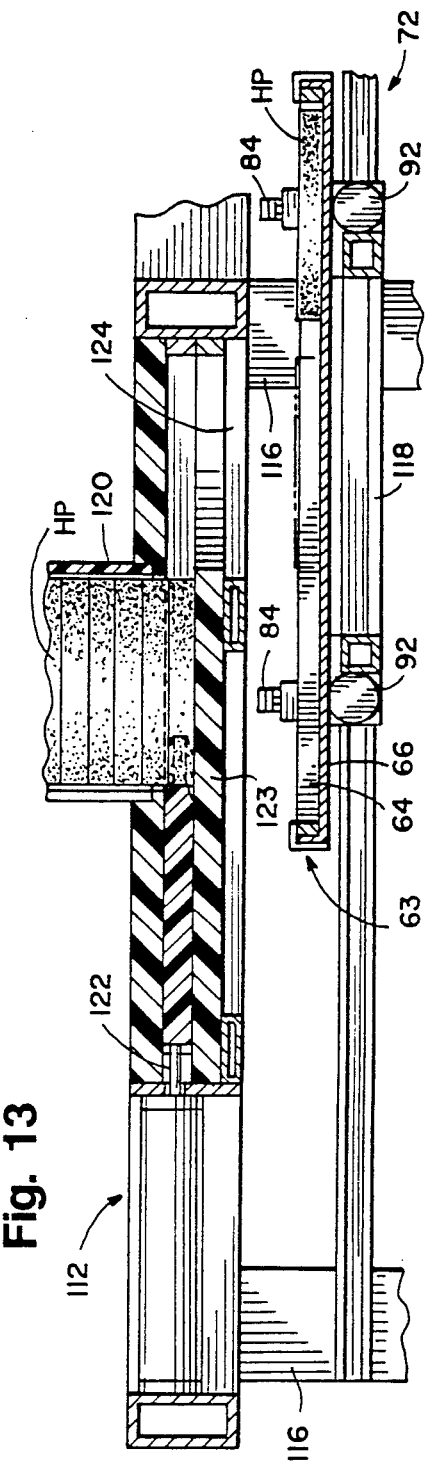

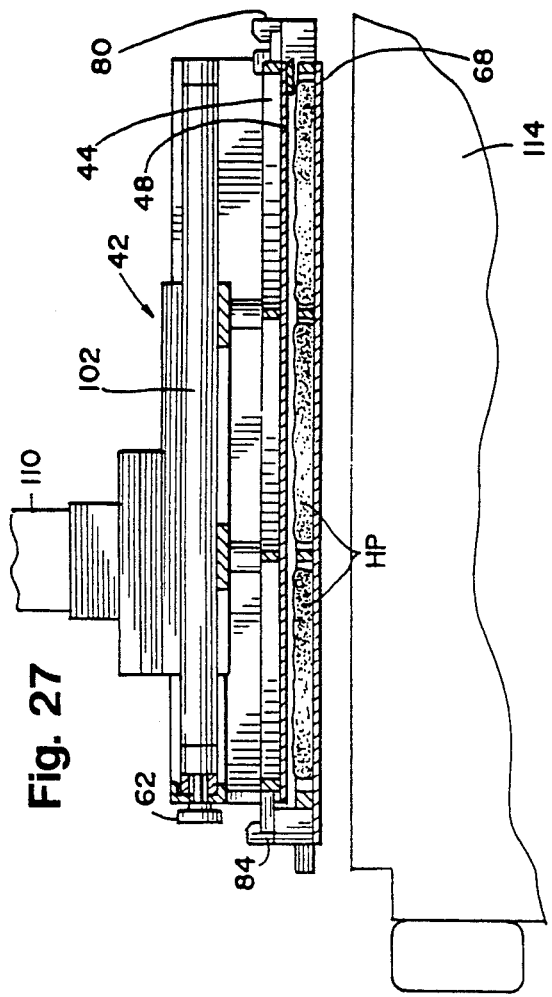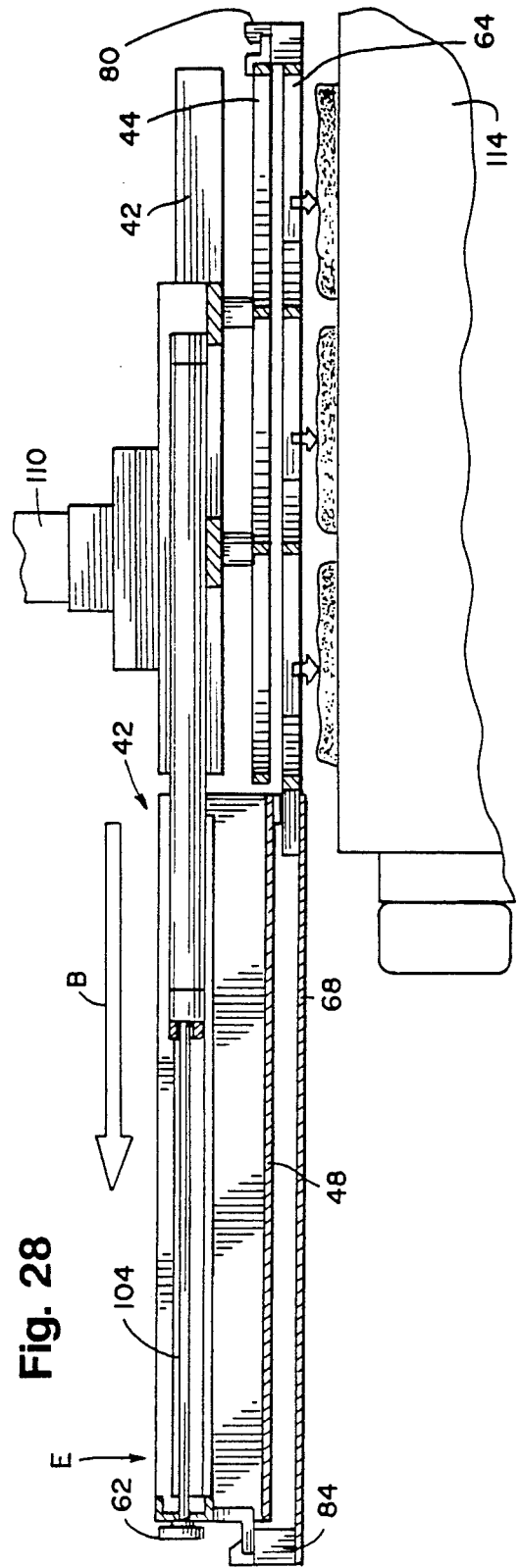
Fig. 27
Fig. 28

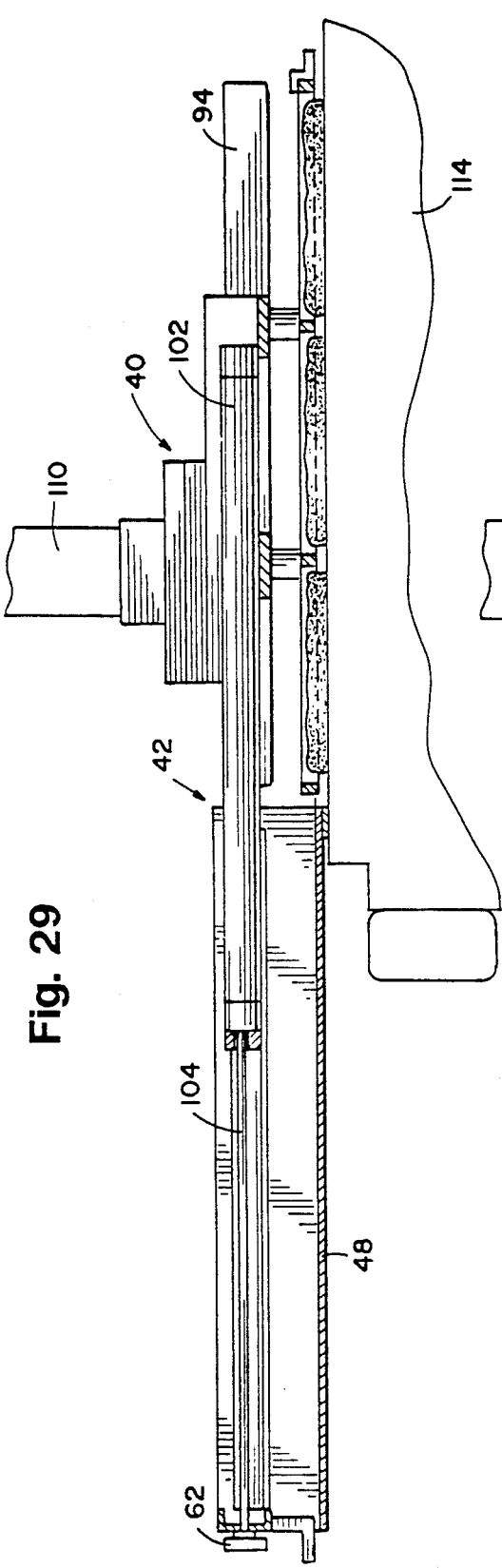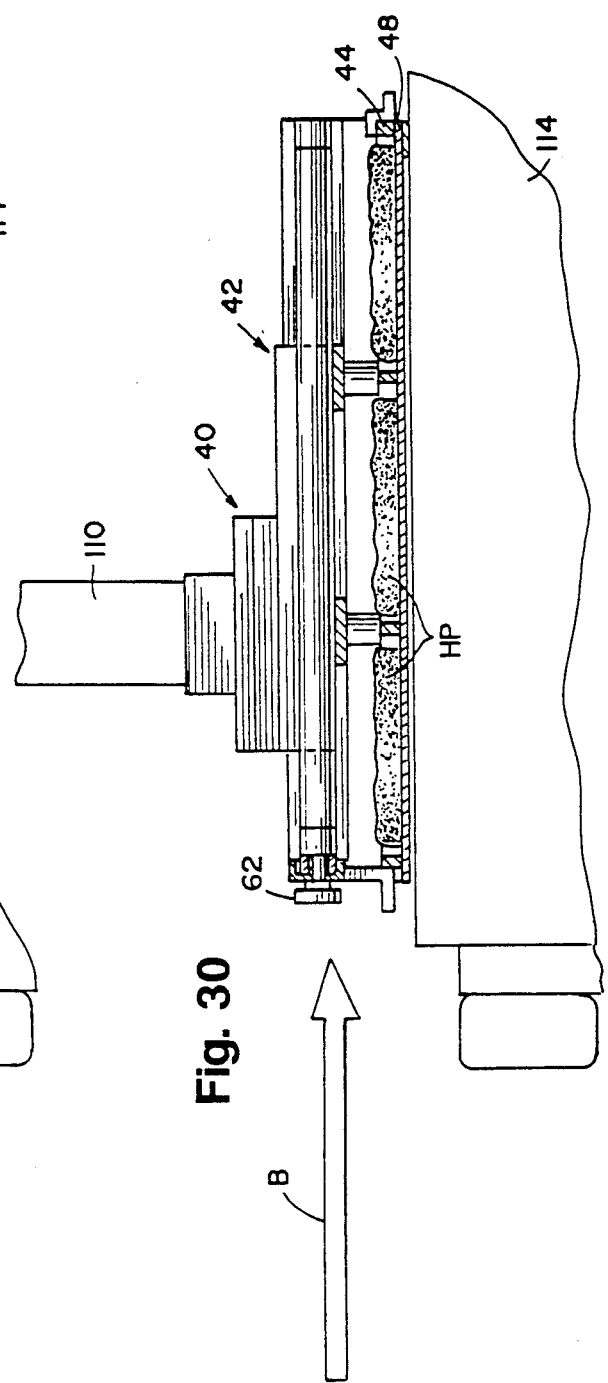

FOOD TRANSPORT FIXTURE AND METHOD

This Application is a continuation of application Ser. No. 07/519,520 filed May 4, 1990, now abandoned.

FIELD OF THE INVENTION

The invention relates to an apparatus and method for the transportation of food items. More particularly, the invention relates to an apparatus and method for receiving, transporting, depositing and retrieving a plurality of food items in a changeable predetermined array.

BACKGROUND OF THE INVENTION

In restaurants, especially quick service (fast food) restaurants, fast, consistent, efficient and safe food preparation is essential for a successful operation. One important task frequently required in the preparation of quick service food items is the simultaneous transferring of large numbers of food items to or from various food preparation stations. The simultaneous transfer of these items is typically labor intensive work which frequently requires a high degree of restaurant worker coordination, time and attention if the food items are to be quickly, safely and satisfactorily prepared.

The simultaneous preparation of a large number of hamburger sandwiches is one example of the demands made of workers in a quick service food environment. To perform this task, a worker must remove a large number of hamburger patties from a storage area, add the patties to a grill one at a time, remove the patties when each patty has been sufficiently and uniformly cooked, and place the patties on buns containing the appropriate condiments. Each of these tasks involves a transfer of food items which requires the worker's time and attention. Because many of these tasks simultaneously compete for the worker's time and attention, the worker may find it difficult to consistently produce a cooked product of uniformly high quality.

Even when a grill worker can consistently produce cooked items of uniformly high quality, the worker effort required to reach this result makes the process labor intensive. In areas where workers may be difficult to employ, or when labor resources are better used to perform other tasks, the multiple food transfers required in preparing food results in a labor intensive process.

Finally, the simultaneous preparation of a large number of food items raises potential safety and health issues for both the worker and the customer. First, an opportunity for worker injury may exist whenever a worker is required to transfer food items in close proximity to heated objects such as a grill or fry vat. Additionally, the sanitation concerns that are inherent to food service work generally are implicated each time a worker handles a food item during the preparation process.

Although quick service restaurants have existed for many years and now number in the tens of thousands, these establishments typically continue to use labor intensive, manual processes to prepare large numbers of food items.

Accordingly, a need exists for a commercially suitable food transfer system which reduces labor requirements and enhances the ability of the worker to safely and efficiently produce a product of consistently high quality.

SUMMARY OF THE INVENTION

In accordance with the present invention, a food transfer fixture is disclosed that is especially adapted for a fast food restaurant. The fixture is capable of receiving, transferring, discharging and retrieving food items between food processing stations. The food items could be virtually any product which requires frying, baking, thawing, or any other food preparation step or steps. The food items can be cooked or uncooked, frozen or non-frozen and have virtually any shape. The present invention is especially suited to transferring uncooked patty-shaped objects from a storage area to a grill for cooking, and then transferring the cooked products from the grill.

More specifically, in one embodiment of the invention, structure is included for horizontally surrounding at least one object to be transported, supporting the object from below, and moving the support structure relative to the surrounding structure to allow an object to be retained in or discharged from the fixture. Additional structure can be included for removably attaching additional surrounding and support structures below and in registry with the first surrounding and support structures to effect a second transfer. Also, structure may be included for depositing and retrieving a plurality of objects in a horizontal planar array to facilitate retrieving of the objects by another tool having a corresponding planar array.

In another embodiment of the invention, a food transfer fixture includes a hoop for surrounding at least one food object and a retractable spatula for selectively supporting the object within, or allowing the object to fall from the hoop by retracting the spatula. An extendable frame is used to horizontally retract or move the spatula from and to the hoop. Additional features can include a horizontal planar array of apertures in the first hoop for receiving and depositing food products in a specific array or geometric pattern, as well as a removably attached second hoop and second spatula subassembly in which the second hoop has a plurality of apertures vertically aligned with the first hoop apertures. This vertical alignment allows items deposited by the second hoop to be retrieved by the first hoop while maintaining the food items in the specific array or geometric pattern. Another feature of the invention can incorporate scoop mounted tracks for allowing the spatula to be slidably mounted relative to its respective hoop.

In still another embodiment of the invention, a food transfer fixture for transferring a plurality of food items includes a first hoop having multiple apertures located in a horizontal planar array for surrounding food items, a first spatula slidably mounted below the first hoop for supporting the food items, and an extendable frame for horizontally moving the first spatula relative to the first hoop to permit the food items to fall from the hoop when the spatula is moved horizontally to retract it from the hoop. The invention also includes a removably attached second hoop having multiple second apertures for partially surrounding food items, and a second spatula slidably mounted on the second hoop for supporting and discharging food items from the second hoop. An additional feature that can be included is a shuttle for transporting the second hoop and spatula to and from a food item dispensing station and for carrying second hoop and spatula release structure for removing the second hoop and spatula from the fixture. Another optional feature is a moveable arm system for the extendable frame that includes two moveable arms for allowing the spatulas to be moved a first distance and then a second additional distance horizontally from their respective hoops.

Finally, in accordance with another embodiment of the invention, a method for transporting food items from one food processing station to another is provided which includes the steps of loading food items into a food transfer item subassembly in a horizontal planar array, transferring the subassembly to a second food preparation area, depositing the food items in substantially the same horizontal planar array, and retrieving the food items in substantially the same planar array. Additional steps can include loading food items into a first subassembly for transferring and depositing and then retrieving the food items in the same array with a second subassembly for further processing.

In accordance with one aspect of the invention, a food transfer fixture is provided which permits the efficient transfer of a large number of food items from one processing station to another.

In accordance with another aspect of the invention, a food transfer system is provided which minimizes the need for manual handling of individual food items.

In accordance with yet another aspect of the invention, a food transfer fixture is provided which reduces food worker labor requirements.

In still another aspect of the invention, a food transfer fixture is provided which enhances the uniformity and quality of prepared food items.

In accordance with yet another embodiment of the invention, a food transfer fixture is provided which minimizes worker contact with food items and food preparation equipment, thereby minimizing the risk for worker injury and enhancing the sanitary handling of food items.

BRIEF DESCRIPTION OF THE DRAWINGS

FIG. 4 is a top plan view of the frame of FIG. 3 in the retracted position.

FIG. 5 is a fragmentary elevational view along lines 5—5 of FIG. 4 illustrating the operation of an uncooked hoop spring loaded finger.

FIG. 6 is a fragmentary elevational view along lines 6—6 of FIG. 4 of a transfer shuttle hoop guide pin and hoop guide aperture.

FIG. 11 is a top plan view of the uncooked patty dispensing station of FIG. 10 illustrating the operation of the patty dispensing rams.

FIGS. 12 and 13 are fragmentary side elevational views of the uncooked patty dispensing station of FIG. 11 which illustrate the filling of the uncooked patty subassembly.

FIGS. 27 through 31 are fragmentary side elevational views showing the detailed operation of the food transport fixture at several points in the food preparation cycle illustrated in FIGS. 14 through 26.

DETAILED DESCRIPTION OF THE INVENTION

Figure 1:
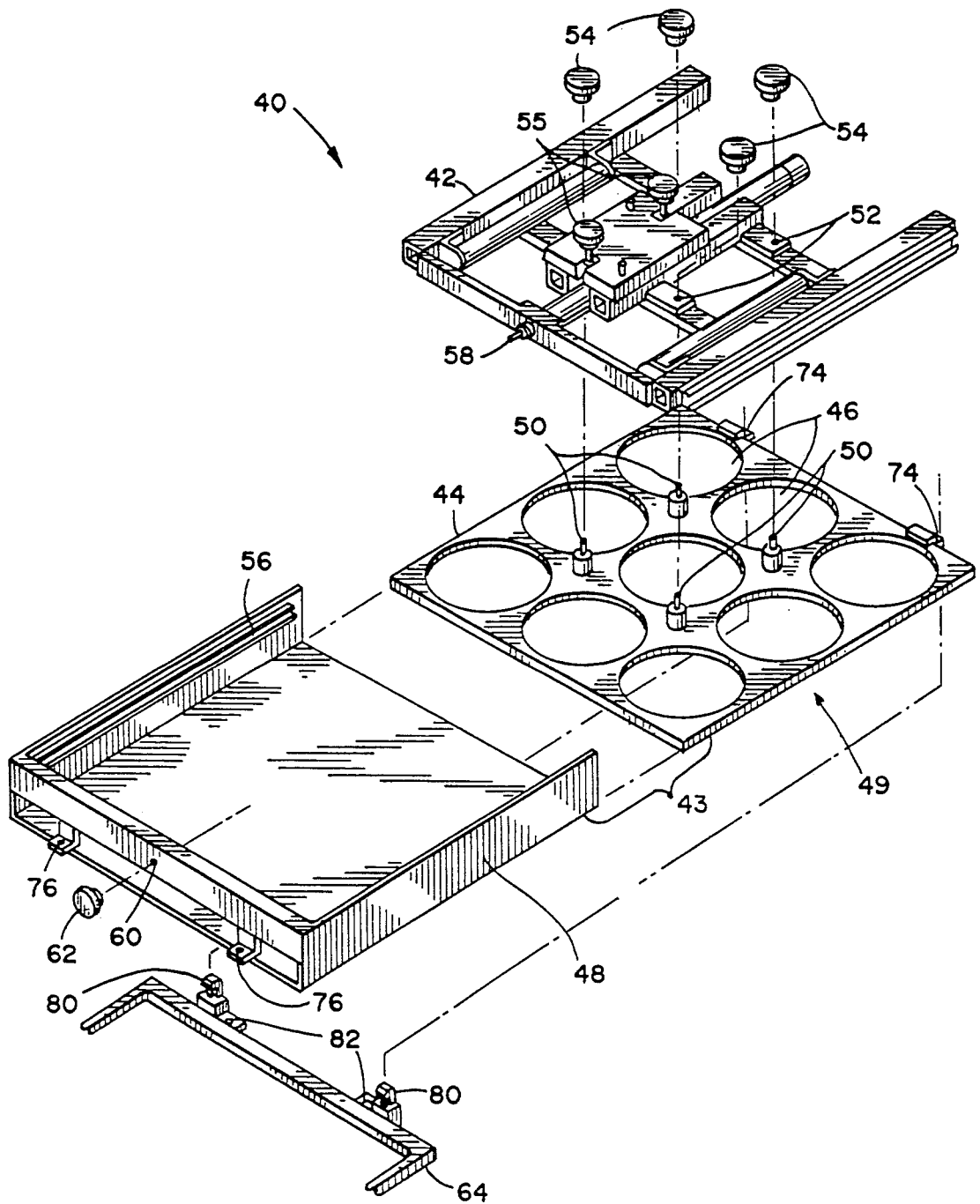
FIG. 1 is a perspective view of one embodiment of the grill cell end-of-arm tool or food transport fixture showing the extendable fixture frame and the cooked patty subassembly.

FIGS. 1-31 illustrate one embodiment of a food transport fixture invention which can be used to receive, transport, discharge and retrieve a plurality of food items between various food processing stations. Throughout these drawings, like reference numerals refer to like parts. The illustrated embodiment is adapted for use as part of an automated food preparation system intended for use in a quick service restaurant which is disclosed in U.S. patent application Ser. No. 07/519,387, filed concurrently herewith entitled "Food Preparation System and Method.

As will be explained later, the described embodiment is an end-of-arm tool for use with a robot arm. The tool can accept a plurality of uncooked hamburger patties from a patty dispenser station, deliver and deposit the patties on a grill, remove the cooked patties from the grill, and deposit the cooked patties on a tray or on bun crowns, heels or on other desired items. Although this embodiment is designed for use in hamburger grilling, it will be obvious from the following discussion that the invention can be adapted to any of a variety of manual or automatic food transport tasks which require the movement of fresh, frozen, uncooked or cooked food items to or from food processing stations. For example, another embodiment of the invention might be used to transfer uncooked pizza pies from a storage area to a cooking oven and then subsequently used to transfer the cooked items out of the oven for cooling, packaging or serving.

Figure 2:
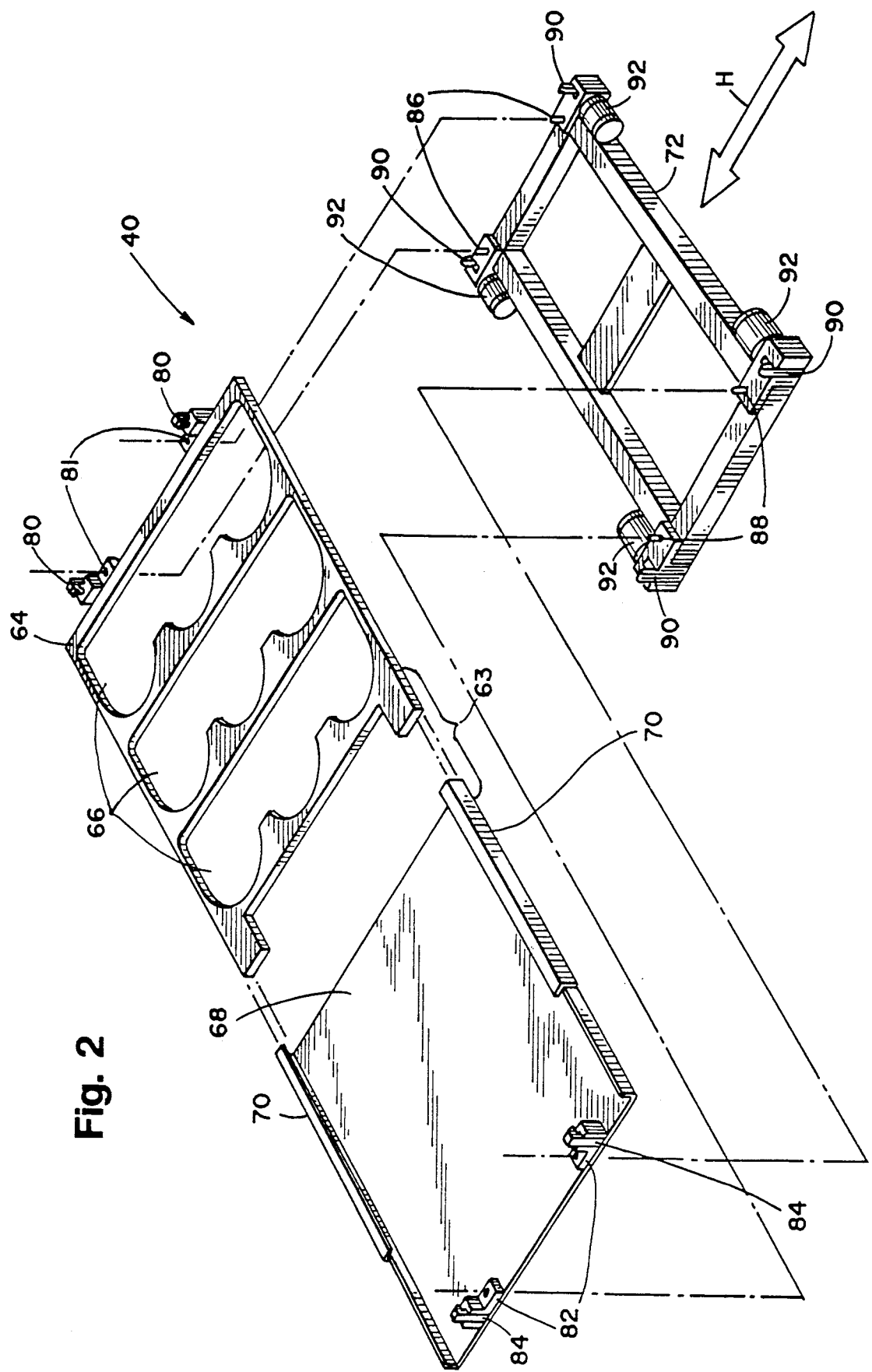
FIG. 2 is a perspective view of additional components of the embodiment of the transport fixture of FIG. 1 showing the uncooked patty subassembly and the transfer shuttle.

FIGS. 1 and 2 illustrate the basic components of a hamburger grilling embodiment of the food transport fixture invention. In FIG. 1, a food transport fixture 40 includes an extendable fixture frame 42 which supports a cooked patty subassembly 43. Subassembly 43 includes a cooked patty hoop 44 having a plurality of hoop apertures 46 and a cooked patty spatula 48. Apertures 46 fix the location of individual cooked hamburger patties when cooked patty spatula 48 is inserted under or withdrawn from under hoop 44 by the action of extendable frame 42 as will be discussed in detail in conjunction with FIG. 3. Hoop 44 and its apertures 46 represent an important aspect of the invention because they allow patties HP to be discharged from or retrieved by fixture 40 in a horizontal planar array substantially identical to the horizontal planar array 49 of apertures 46 in hoop 44. The regular pattern of array 49 permits the subsequent retrieval of the patties by any fixture or utensil having a similar planar array aperture pattern.

Cooked patty hoop 44 is attached to frame 42 by inserting four upwardly-directed cooked patty hoop threaded studs 50 through four frame stud apertures 52 located in frame 42. Four cooked patty hoop retaining nuts 54 are then affixed to studs 50. In the preferred embodiment, nuts 54 consist of knurled knobs which can be easily removed for fixture disassembly and cleaning. Frame 42 also includes a pair of attachment nuts or bolts 55 which allow the tool to be gripped for raising by a robot arm as will be discussed in conjunction with FIGS. 7-9.

Cooked patty spatula 48 includes a pair of tracks 56 which allow spatula 48 to be slidably mounted on hoop 44. Spatula 48 is attached to frame 42 by pushing frame spatula stud 58 through a spatula stud aperture 60 and attaching a spatula securing nut 62. Preferably, nut 62 is also knurled to allow for easy disassembly.

Figure 8:
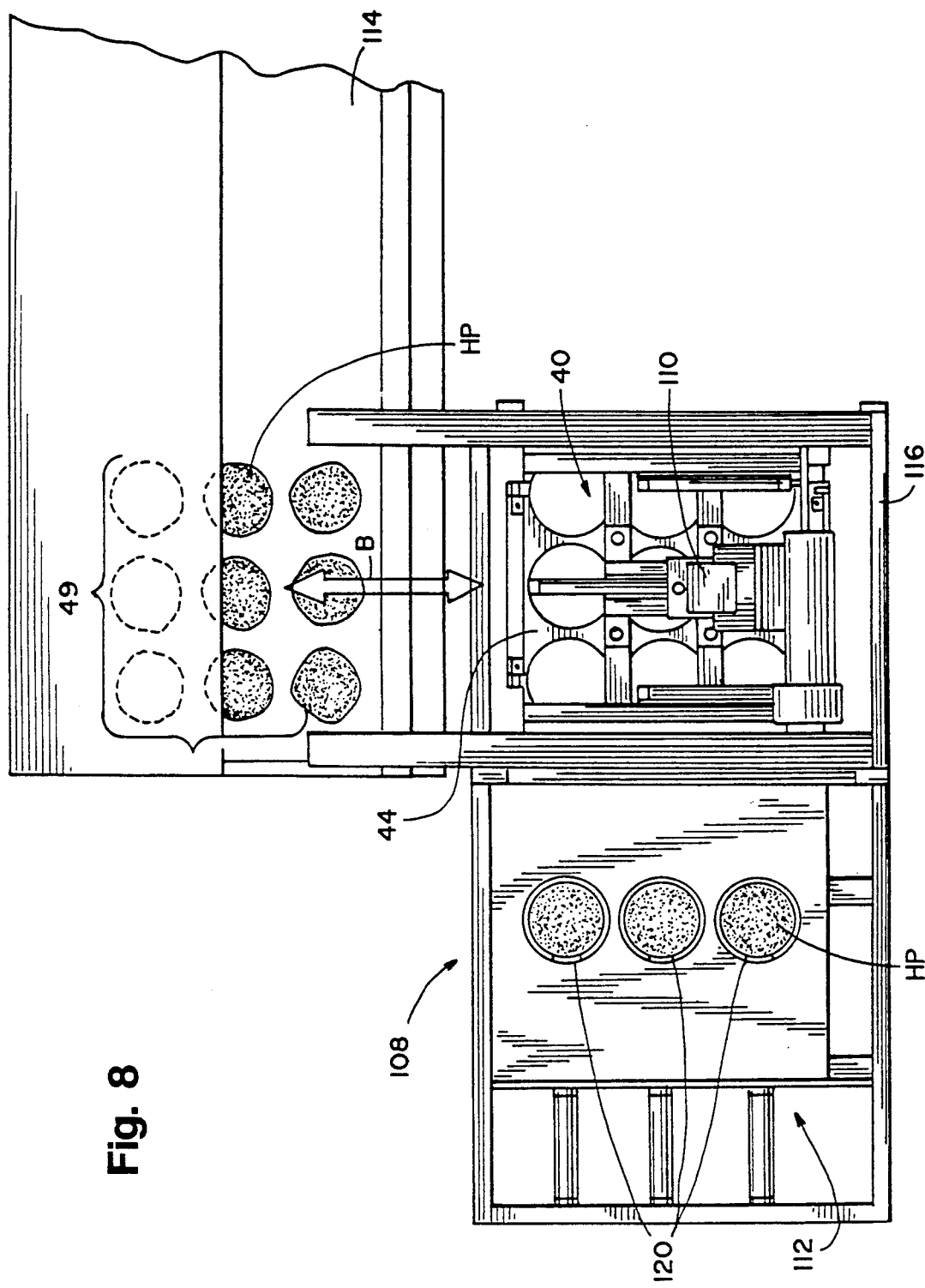
FIG. 8 is a top plan view of the system of FIG. 7 showing the relative location of various food preparation system components including a grill, a robot arm and an uncooked patty loading station.

Other major components of fixture 40 are illustrated in FIG. 2. An uncooked patty subassembly 63 includes an uncooked patty hoop 64 having a plurality of uncooked patty hoop apertures 66. Apertures 66 have a shape useful for depositing a plurality of hamburger patties on a grill in the horizontal planar array 49 pattern of hoop 44 as shown in FIG. 8. Apertures 66 are in vertical alignment with apertures 46, thereby permitting patties deposited in planar array 49 by uncooked subassembly 63 to be successfully reacquired by cooked subassembly 43. The use of separate cooked and uncooked subassemblies prevents the possible spread of bacteria from uncooked to cooked food.

Subassembly 63 also includes an uncooked patty spatula 68 which is slidably mounted to hoop 64 by a pair of uncooked patty spatula tracks 70. Tracks 70 permit spatula 68 to slide back and forth on hoop 64 to allow patties to be discharged from or reacquired by subassembly 63. Hoop 64 and spatula 68 can rest on a patty shuttle 72 for movement to and from an uncooked patty dispenser (see FIG. 9), and for removing uncooked subassembly 63 from fixture 40 as described in the following paragraph.

Figure 25:
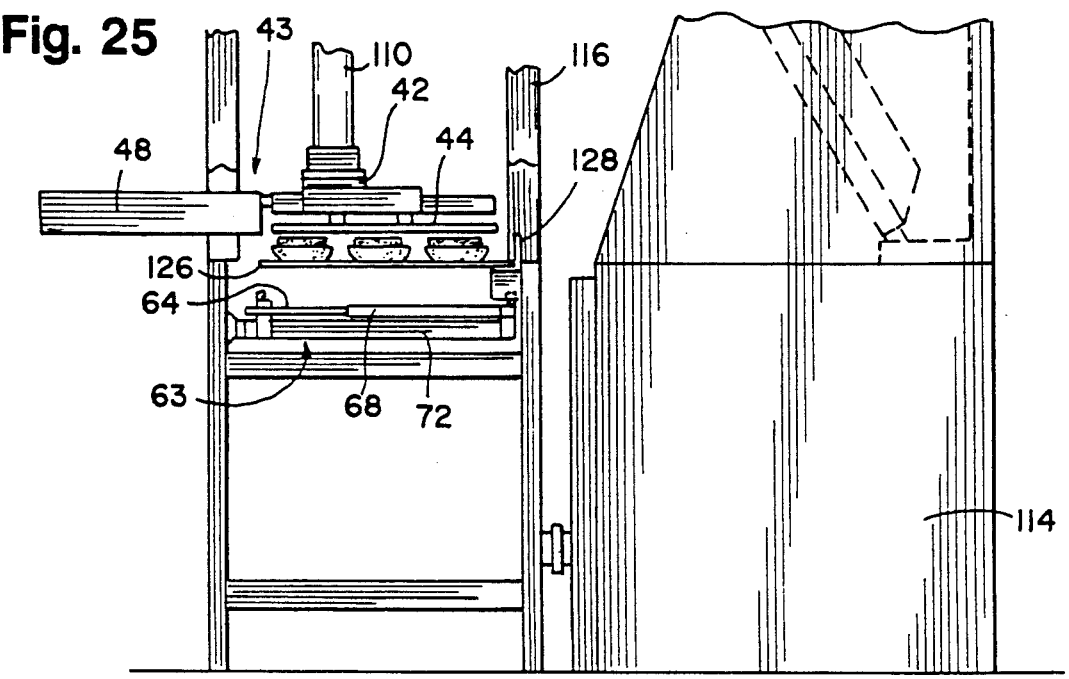

Uncooked subassembly 63 is designed to be removably attached beneath cooked patty subassembly 43 as can be seen in FIG. 25. Structures included for this purpose which are illustrated in FIG. 1 include cooked patty hoop guide apertures 74, cooked patty spatula guide apertures 76 and uncooked patty hoop pivotable spring loaded fingers 80 (also illustrated in FIG. 2). Additional attaching structures illustrated in FIG. 2 include uncooked patty hoop guide apertures 81, uncooked patty spatula guide apertures 82, uncooked patty spatula spring loaded fingers 84, shuttle hoop guide pins 86, shuttle spatula guide pins 88, pivotable spring finger release levers 90 (see FIG. 5), and spring finger lever cylinders 92. The cooperative action of the uncooked patty subassembly attaching components listed above will be described later in conjunction with FIGS. 5 and 6.

When uncooked patty subassembly 63 is attached to cooked patty subassembly 43, cooked patty spatula 48 and uncooked patty spatula 68 are slidably moveable from their respective hoops 44 and 64 by the horizontal movement of extendable frame 42. As shown in FIG. 1, spatula 48 is directly attached to frame 42 and therefore moves when frame 42 moves. Because spatula 68 is attached to spatula 48 by spring loaded fingers 80 and 84, spatula 68 moves whenever frame 42 moves spatula 48.

Figure 3:
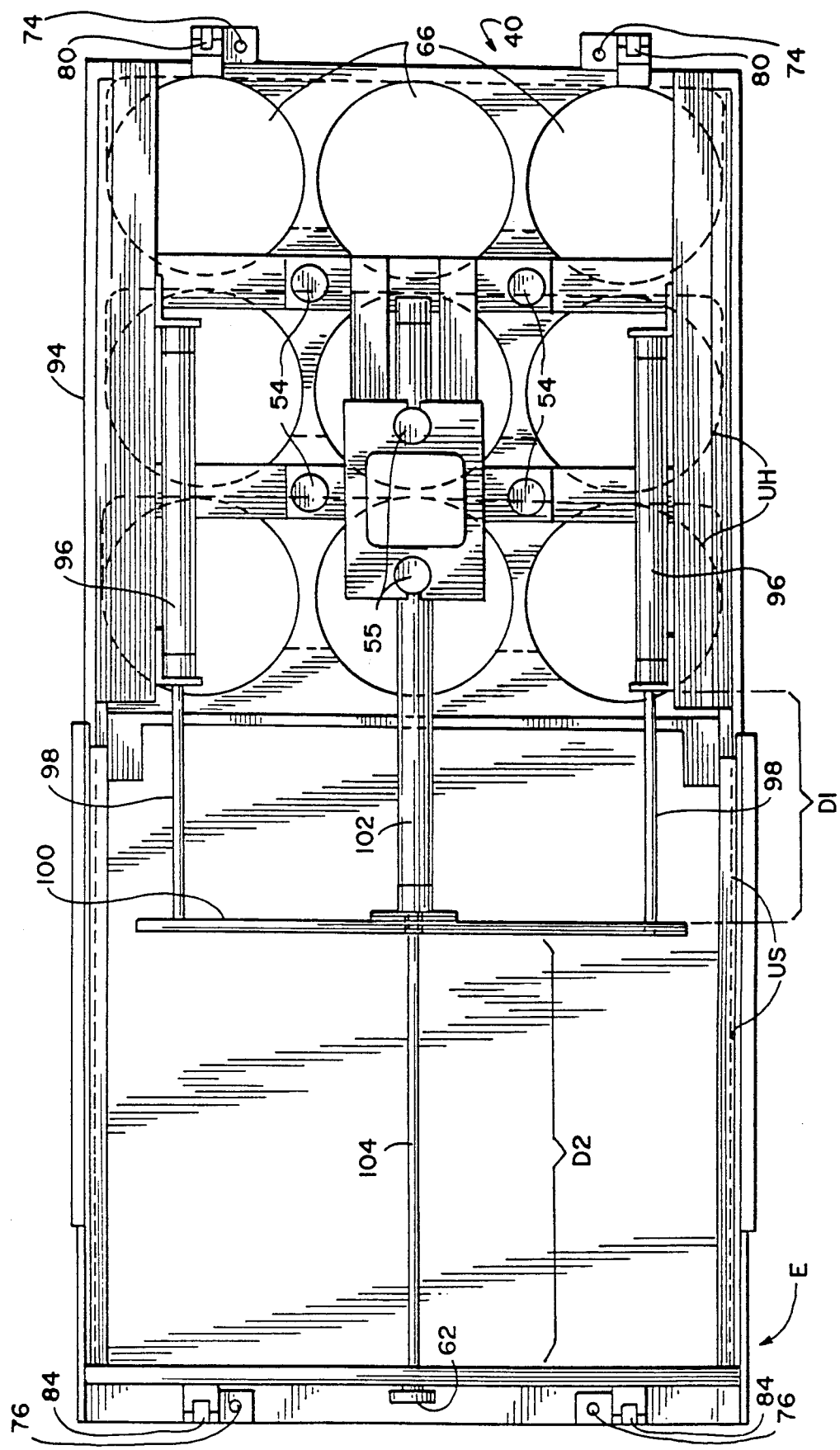
FIG. 3 is a top plan view of the extendable fixture frame in its extended position with both the cooked and uncooked patty subassemblies attached.

Frame 42 moves between a retracted position R shown in FIG. 4 and an extended position E shown from above in FIG. 3. When frame 42 is in retracted position R, cooked patty spatula 48 and uncooked patty spatula 68 (shown by dashed line US) is directly beneath cooked patty hoop 44 and uncooked patty hoop 64 (shown by dashed line UH), respectively, as shown in FIG. 27. This allows uncooked hamburger patties to be held within hoop apertures 66 and supported from beneath by spatula 68 for transport to a grill. When frame 42 is moved to extended position E, spatulas 48 and 68 are no longer beneath hoops 44 and 64, and uncooked patties supported on spatula 68 will fall to the grill in the horizontal planar array 49 of FIG. 8 as shown in FIG. 28. As previously discussed, this permits retrieval of cooked patties by the similarly arrayed apertures of cooked patty hoop 44, shown in FIGS. 29 and 30.

It should be noted that uncooked hoop apertures 66 can be of a different form than cooked hoop apertures 46. This is because uncooked apertures 66 need only fix the location of hamburger patties when spatula 68 is withdrawn or moved to the extended position. Therefore, apertures 66 need only be semicircular shaped at the trailing edge of the hamburger, which permits a longer portion of hoop 64 to be cut away so that it is lighter. In contrast, hoop 44 must fix the position of patties during withdrawal and insertion of spatula 48, and therefore must be semicircular on both the leading and trailing edges of the hamburger patties to fix their position.

The components responsible for the horizontal movement of frame 42 are shown in FIG. 3. Extendable frame 42 includes a fixed frame member 94 to which is mounted a pair of outer cylinders 96. Cylinders 96 each have an outer cylinder rod 98 having its distal end attached to a moveable frame member 100. Frame 42 also includes an inner cylinder 102 affixed to frame member 100 which has an inner cylinder rod 104 attached to cooked patty spatula 48 by nut 62. When frame 42 is in extended position E, cylinder rods 98 and 104 are fully extended from cylinders 96 and 102 respectively. Preferably, cylinders 96 and 102 are hydraulic cylinders to provide smooth cylinder action. It is also preferred that the hydraulic fluid used to drive cylinders 96 and 102 be water or some equally food-compatible substance to prevent food contamination in the event of cylinder leakage.

The movement of frame 42 from extended position E to retracted position R is a two step process. First, outer cylinders 96 and inner cylinder 102 is actuated to pull frame member 100 inward a first distance D1. Outer cylinders 96 move first because of lower operating pressure requirements. Cylinders 96 and 102 move simultaneously once cylinder 102 begins moving. Spatula 48 moves inward the same distance as it is pulled inward by retracting inner cylinder rod 104 which is affixed to frame member 100. Frame 42 is then moved to its fully retracted position R by cylinders 96 and 102 to retract frame 42 a second distance D2. This pulls spatula 48 to a position directly beneath hoop 44. To extend frame 42 to its fully extended position, cylinders 96 and 102 are extended.

The cooperation of the components involved in attaching and removing uncooked patty subassembly 63 from cooked patty subassembly 43 is best described in conjunction with FIGS. 5 and 6. FIG. 5, which is representative of the operation of spatula spring loaded fingers 84 as well as hoop spring loaded fingers 80, shows uncooked patty hoop 64 stacked between patty shuttle 72 and cooked hoop 44. Hoop spring loaded finger 80 is shown in the attached position. Fixture 40 has been lowered onto shuttle 72 so that uncooked patty subassembly 63 can be removed from transport fixture 40 by releasing spring finger 80. In this attached condition, spring finger lever 90 is shown in an initial upright position and spring finger lever cylinder 92 is shown in an initial retracted position. To remove uncooked patty subassembly 63 from cooked patty subassembly 43, lever cylinder 92 is actuated. This causes cylinder rod 106 to move to an extended position (shown in dashed lines). Finger release lever 90 then pivots about lever pivot point LPP, which in turn causes spring finger 80 to pivot about finger pivot point FPP. This pushes the lower end of finger 80 inward, causing spring finger 80 to move outward at its upper end to provide sufficient clearance between finger 80 and hoop 44 for hoop 44 to be moved upward past retracted finger 80.

Subassembly 63 can be attached to subassembly 43 in a similar manner. Hoop 64 is first lowered over a shuttle hoop guide pin 86 passing through guide apertures 81 (as seen in FIG. 6). As the bottom edge of hoop 64 bears down on finger 80, the top of finger 80 pivots inwardly, thereby securing subassembly 63 to subassembly 43.

As previously noted, the illustrated embodiment of fixture 40 is adapted for use in an automated food preparation system. The operation of fixture 40 in this application will now be discussed in connection with FIGS. 7-29.

Figure 7:
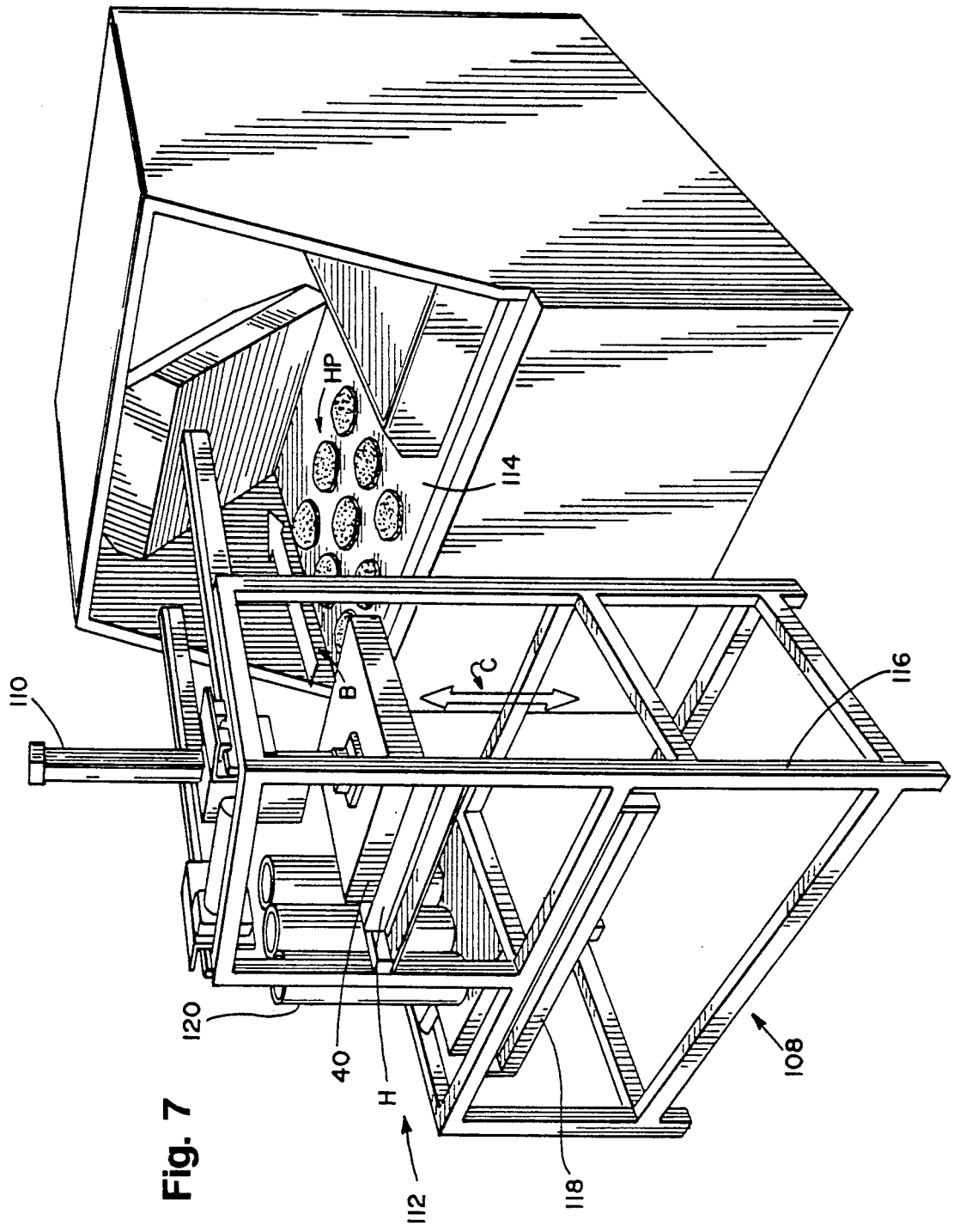
FIG. 7 is a perspective view of an automated food preparation system which employs the illustrated embodiment of the food transport fixture.
Figure 9:
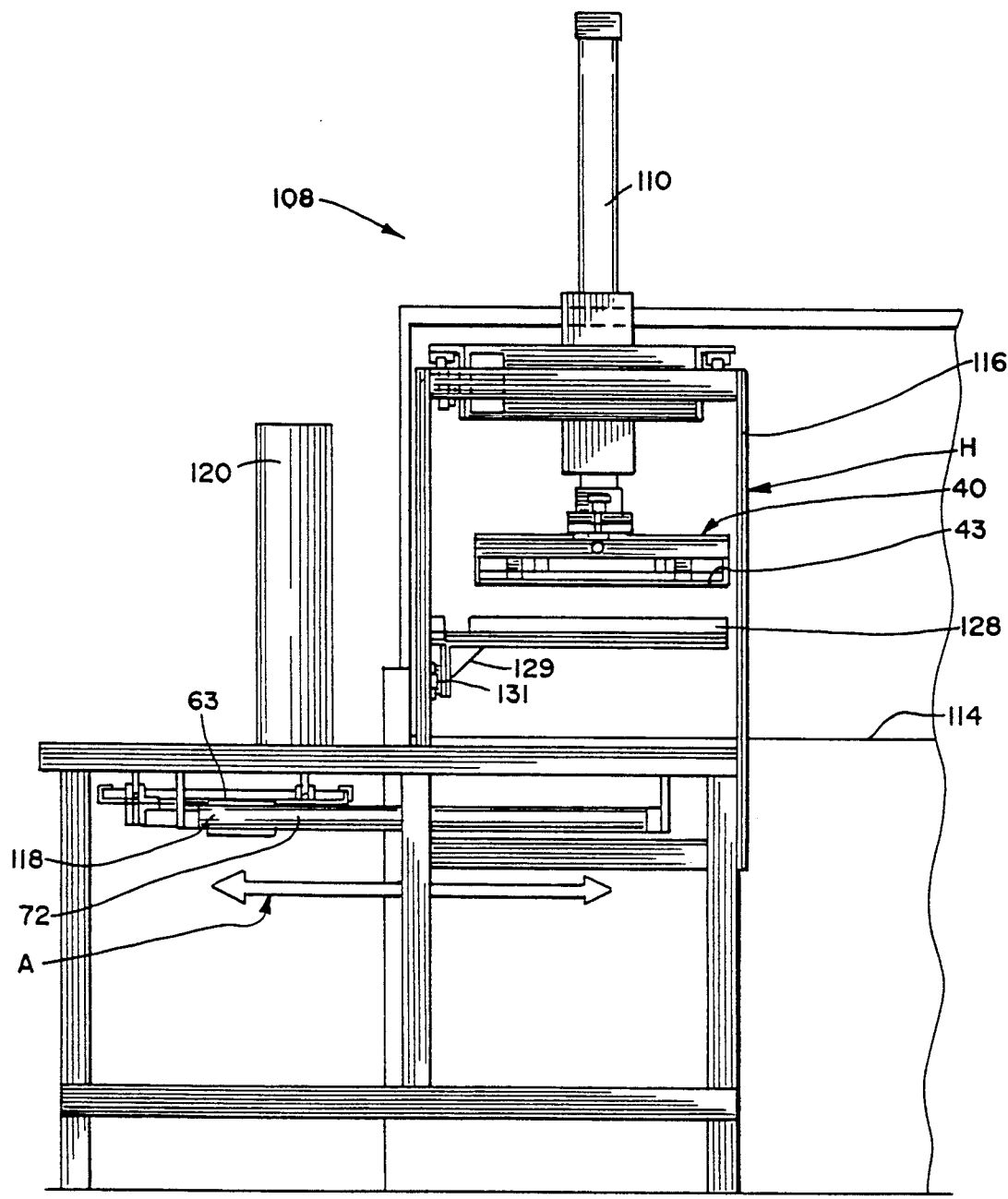
FIG. 9 is a front elevational view of the system of FIG. 8 showing the patty dispensing station and the robot arm with the food transport fixture invention attached.

First referring to FIGS. 7, 8 and 9, fixture 40 is moved about an automated food preparation system 108 by a robot arm 110 capable of gripping grippable frame members 55 (illustrated in FIG. 3). FIG. 7 is a perspective view of preparation system 108 showing the physical arrangement of a patty dispensing station 112, a grill 114 and robot arm 110 with fixture 40 attached and sitting in a "home" position H. As can be seen from FIG. 9, uncooked subassembly 63 moves back and forth in the direction of double arrow A to load patties from dispensing station 112 and moves back and forth in the direction of double arrow B in FIG. 8 to deposit uncooked patties on grill 114. Similarly, cooked patty hoop 44 and spatula 48 move back and forth in the direction of double arrow B to pick up cooked patties from grill 114.

Figure 10:
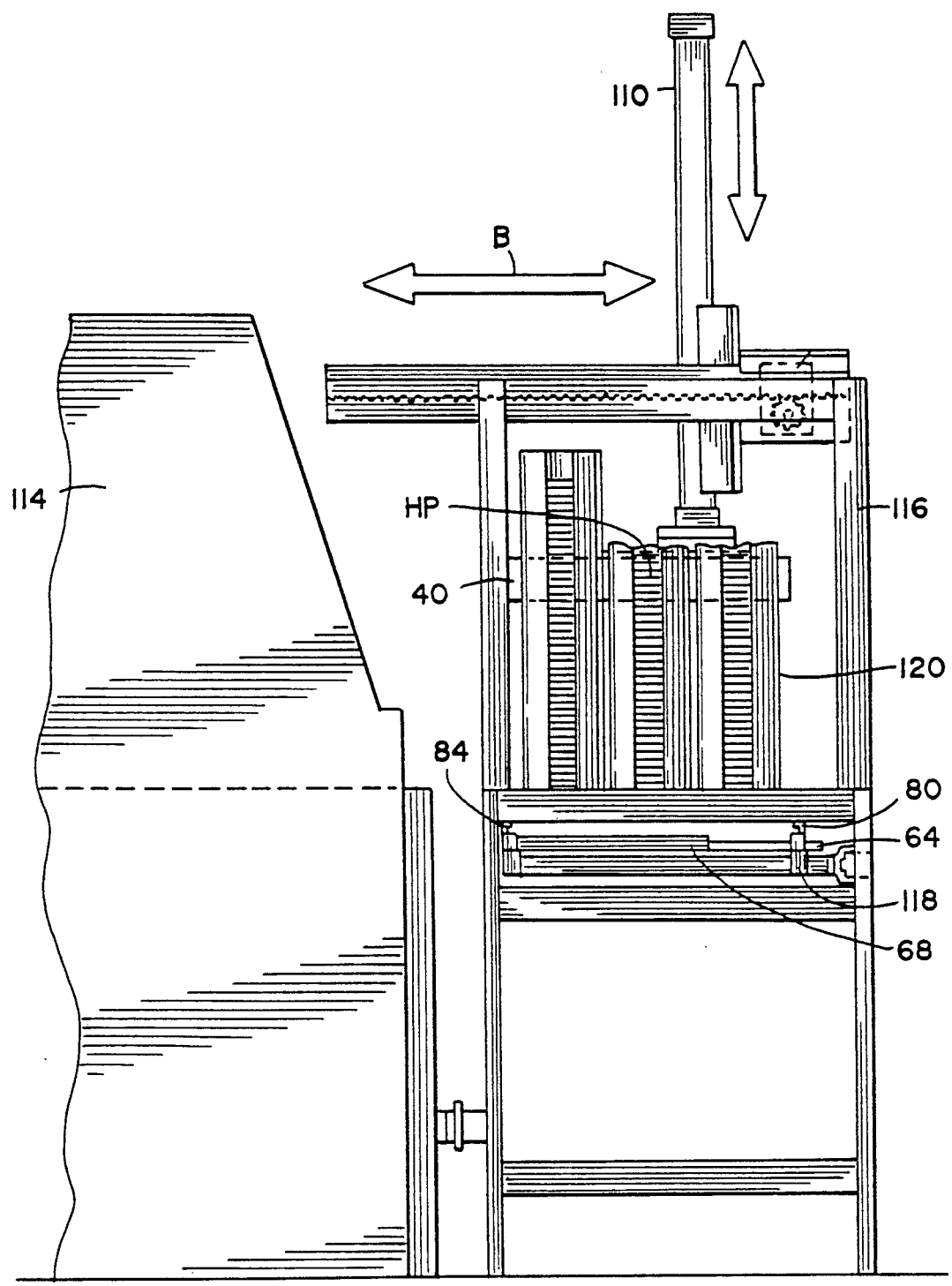
FIG. 10 is a side elevational view of the system of FIG. 8 illustrating the patty dispensing station shown in FIG. 9.
Figure 14:
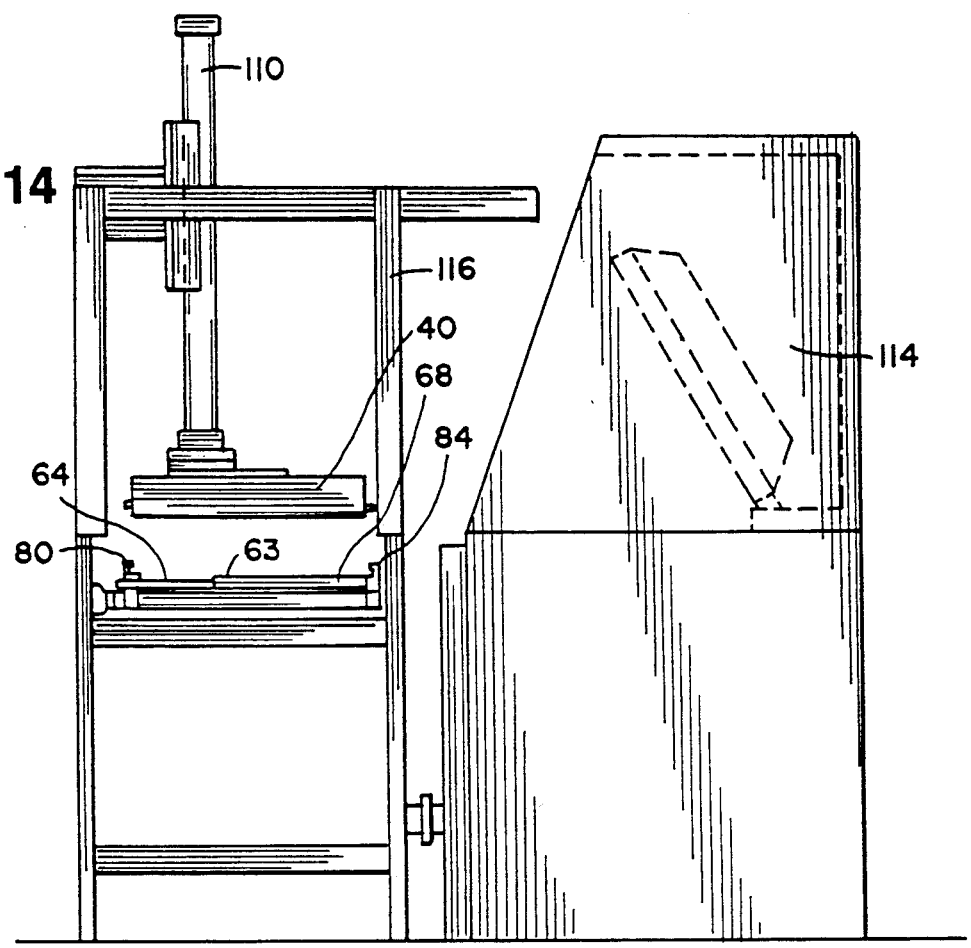
FIGS. 14 through 26 are fragmentary side elevational views showing the movement and operation of the food transport fixture between the patty loading station, the grill and the automated food preparation system rack at various points in the automated food preparation cycle.
Figure 15:
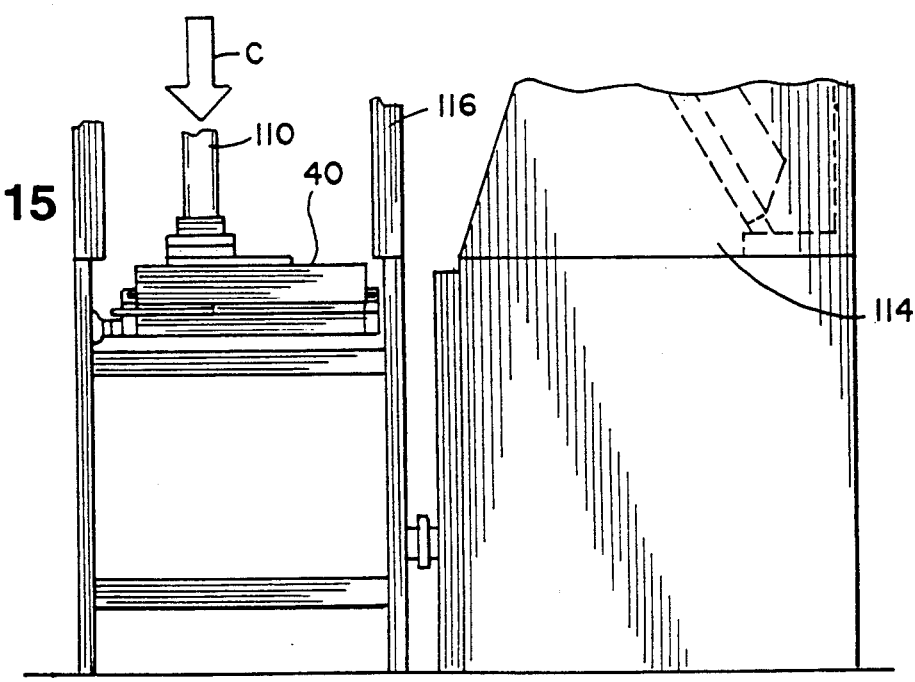
Figure 16:
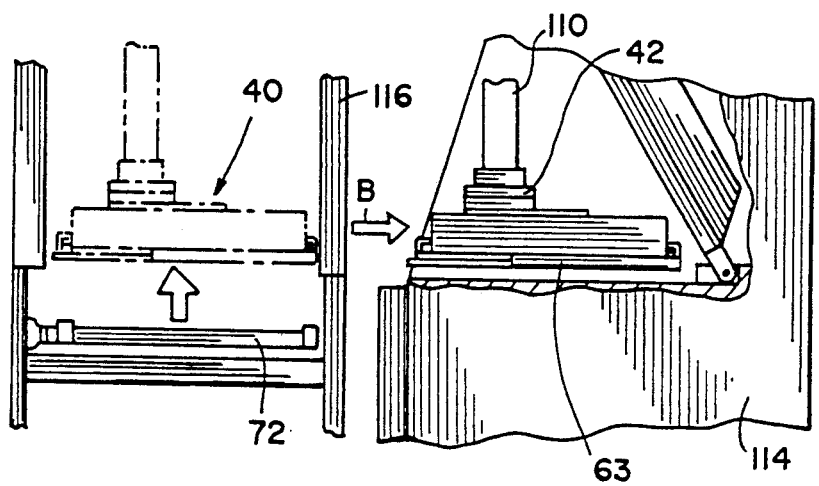

Turning now to FIG. 9, preparation system 108 includes a rack 116 for supporting various system components and a shuttle transfer system 118 for moving shuttle 72 and uncooked subassembly 63 to and from patty dispensing station 112 in the directions of double arrow A (also shown in FIG. 2). The cooking cycle begins when transfer system 118 moves shuttle 72 into patty dispensing station 112 in response to an order to cook patties. Transfer system 118 next positions shuttle 72 beneath three patty hoppers 120 as shown in FIG. 10. Each hopper 120 employs a cylinder operated patty dispensing ram 122 including a moveable patty push arm 123 to push a hamburger patty HP from the bottom of each hopper from a first position indicated by dotted elements 123' and HP' through an uncooked patty dispensing aperture 124 to the position indicated by elements 123 and HP as shown in FIG. 11.

Patties fill uncooked subassembly 63 one row at a time. As patties HP are ejected from hoppers 120 by ram 122, they fall through uncooked patty dispensing apertures 124 (see FIGS. 11, 12 and 13). After a first row of uncooked hoop apertures 66 has been filled with a desired number of patties (see FIG. 12) transfer system 118 indexes shuttle 72 one aperture row at a time (see FIG. 13) until subassembly 63 has been filled with the desired number of patties (1-9 patties in the illustrated embodiment). System 118 then moves shuttle 72 beneath arm 110 and attached cooked patty subassembly 43 at home position H as shown in FIG. 9.

Figure 17:
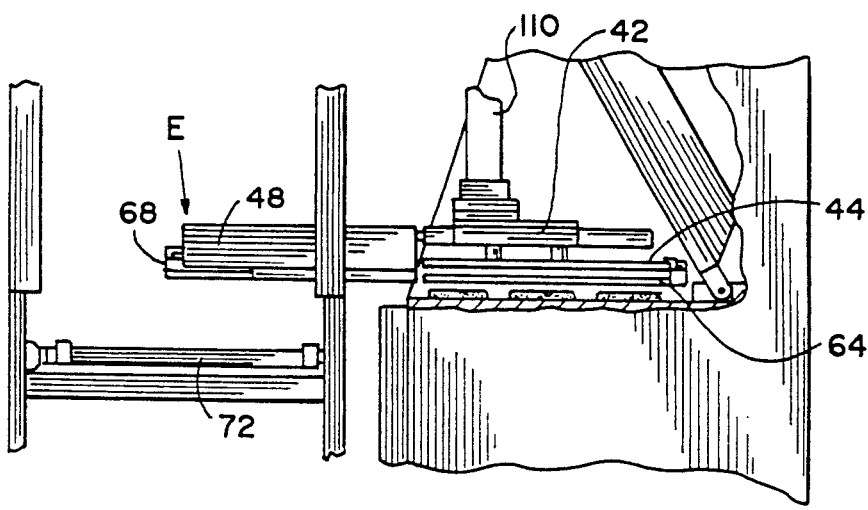
Figure 18:
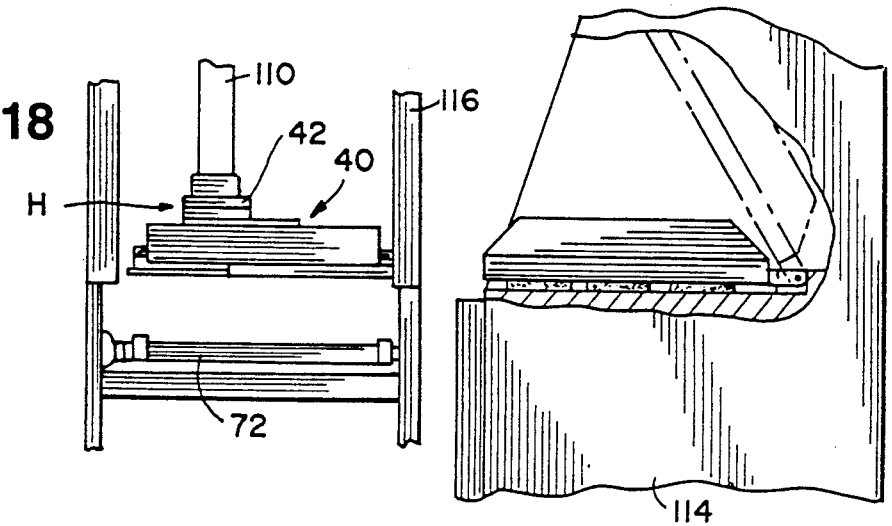
Figure 19:
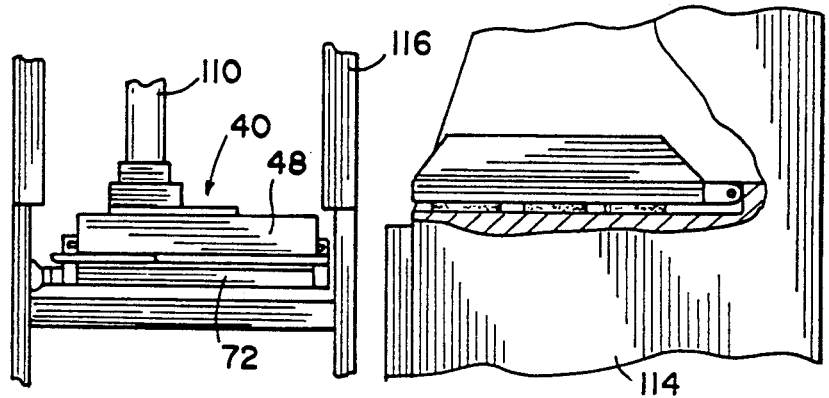

Arm 110, which can be a rodless air cylinder or an electric cylinder, for example, is next lowered in the direction of arrow C in FIG. 7 to engage and clamp uncooked patty subassembly 63. After clamping, arm 110 is raised and positioned over grill 114 as in FIGS. 16 and 27 and moveable frame 42 is moved to its extended position E as shown in FIGS. 17 and 28. This moves uncooked spatula 68 from beneath uncooked hoop 64, and causes patties HP to fall to grill 114 in the horizontal planar array 49 previously described. Frame 42 is then retracted and arm 110 moves fixture 40 back to home position H as shown in FIG. 18.

Figure 26:
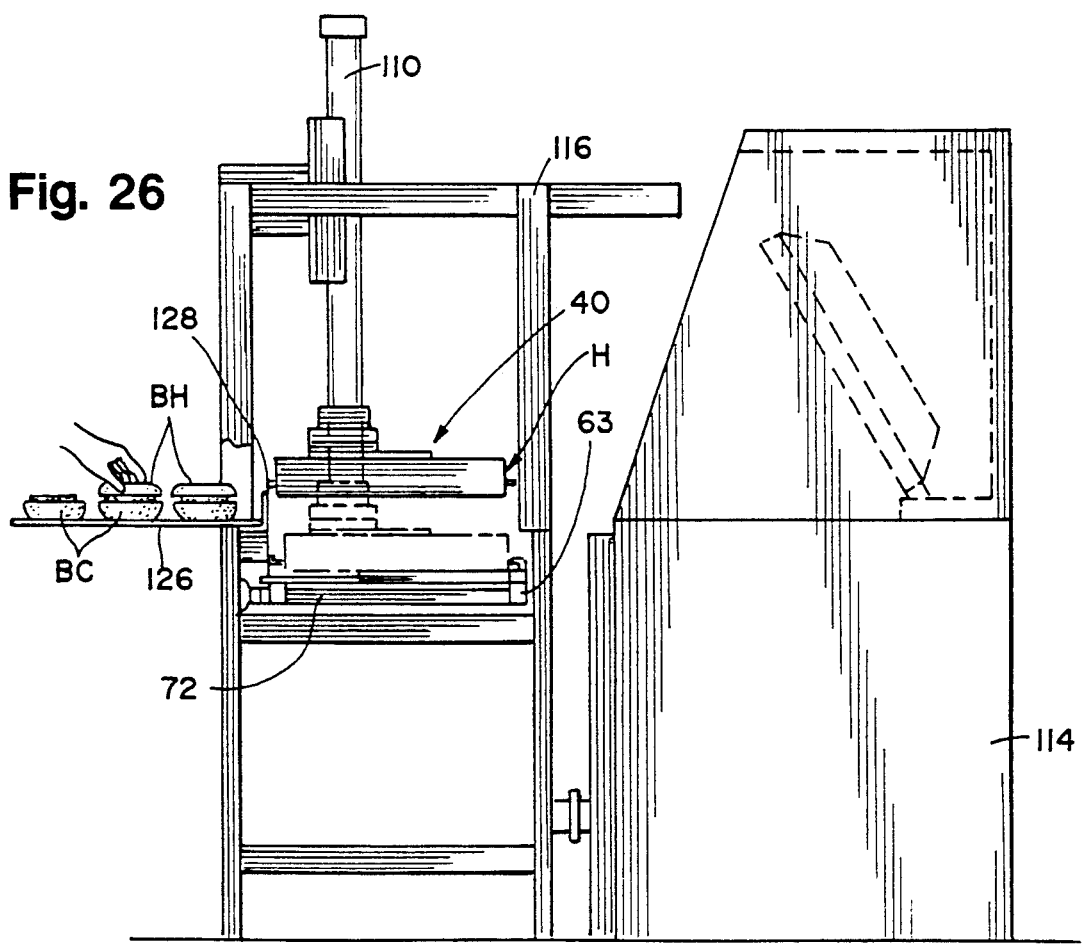

Empty uncooked patty subassembly 63 must now be returned to dispensing station 112 for refilling. To accomplish this, arm 110 lowers subassembly 63 onto shuttle 72 from home position H as shown in FIG. 26. Spring finger lever cylinders 92 are activated, causing subassembly 63 to be released from fixture 40 as already discussed in conjunction with FIG. 5. Transfer system 118 then returns shuttle 72 to station 112 for refilling.

Figure 21:
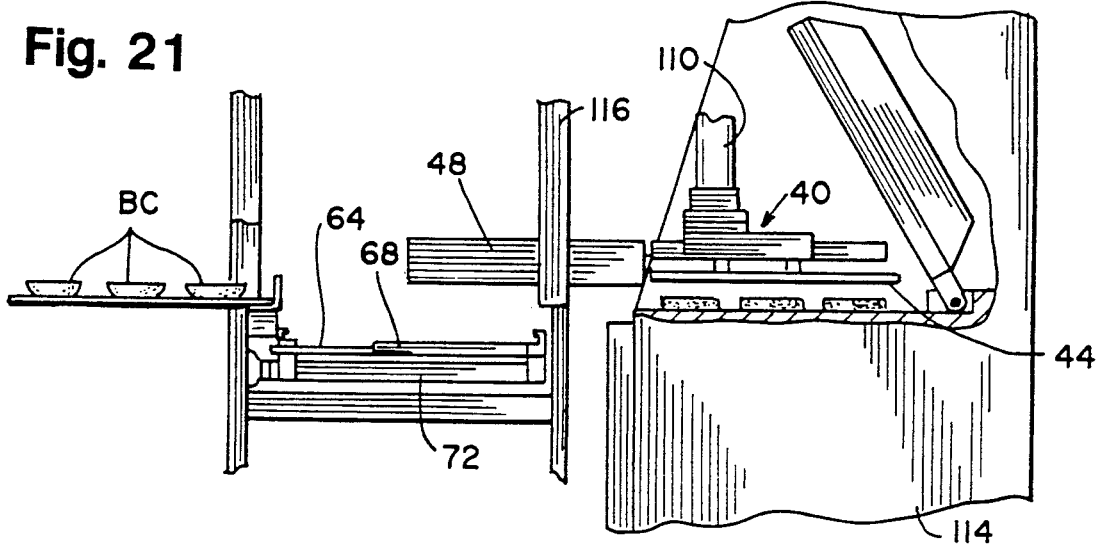

After patties HP have been cooked on grill 114, fixture 40 must be returned to grill 114 to remove patties HP. This is accomplished by moving arm 110 back over grill 114 and extending frame 42, which moves cooked patty spatula 48 from beneath cooked patty hoop 44 as shown in FIGS. 21 and 29. Arm 110 is then lowered so that spatula 48 is horizontally aligned with the portion of grill 114 on which patties HP rest. Frame 42 is then returned to its retracted position causing spatula 48 to pass between patties HP and grill 114, scooping patties HP into fixture 40 as shown in FIGS. 29 and 30. Arm 110 then re filled fixture 40 to home position H shown in FIG. 23.

Figure 20:
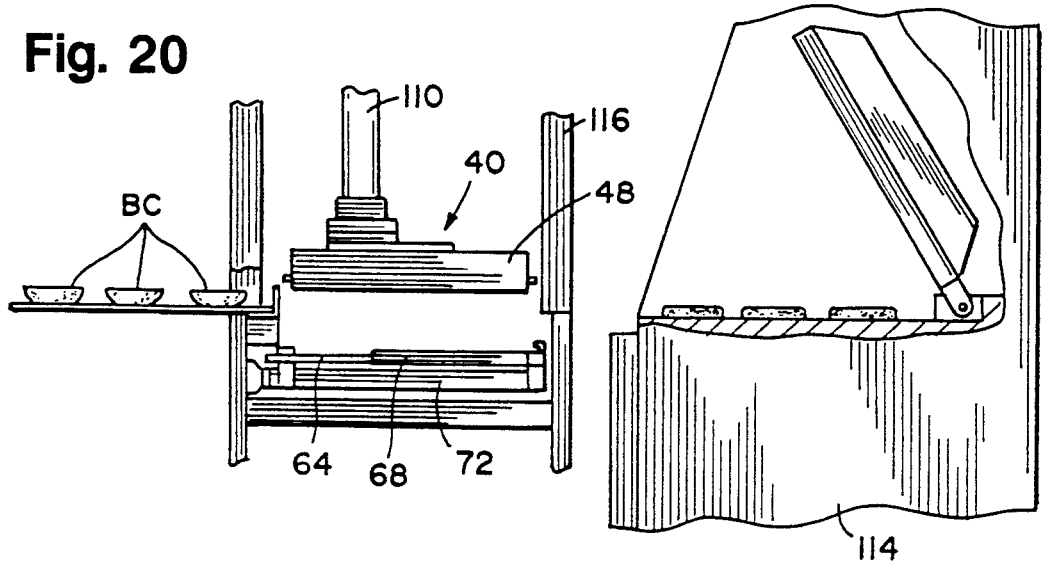
Figure 22:
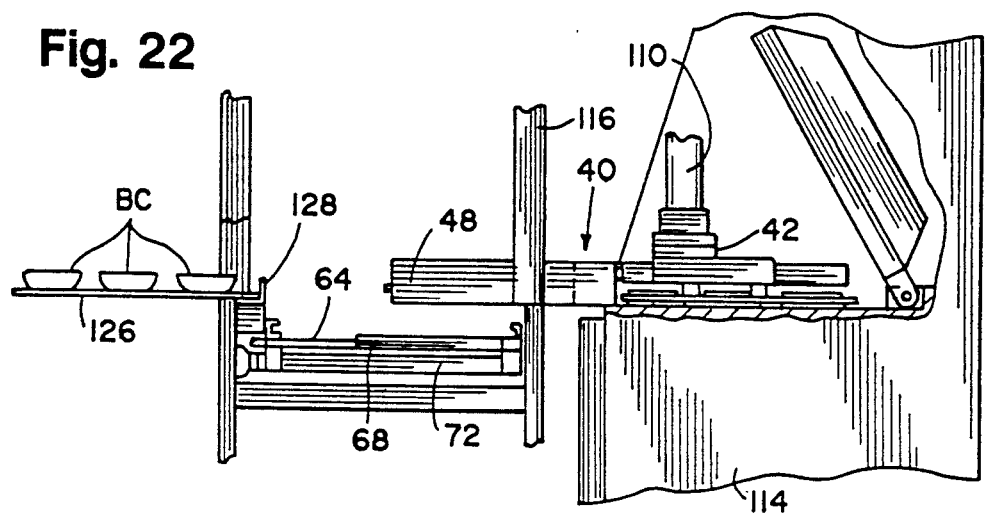
Figure 23:
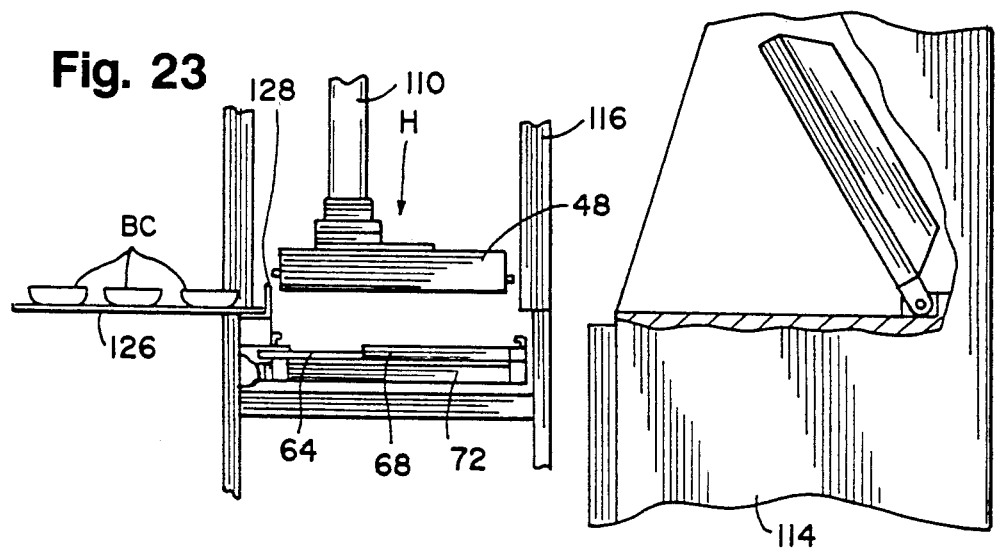
Figure 24:
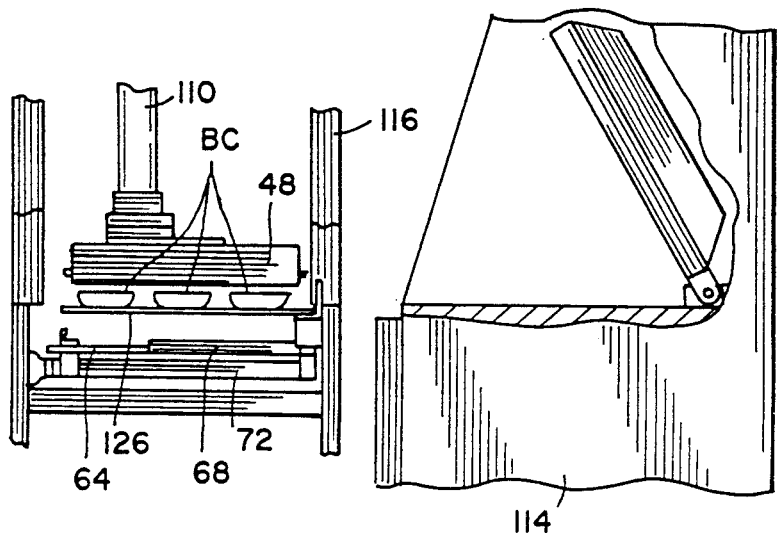
Figure 31:
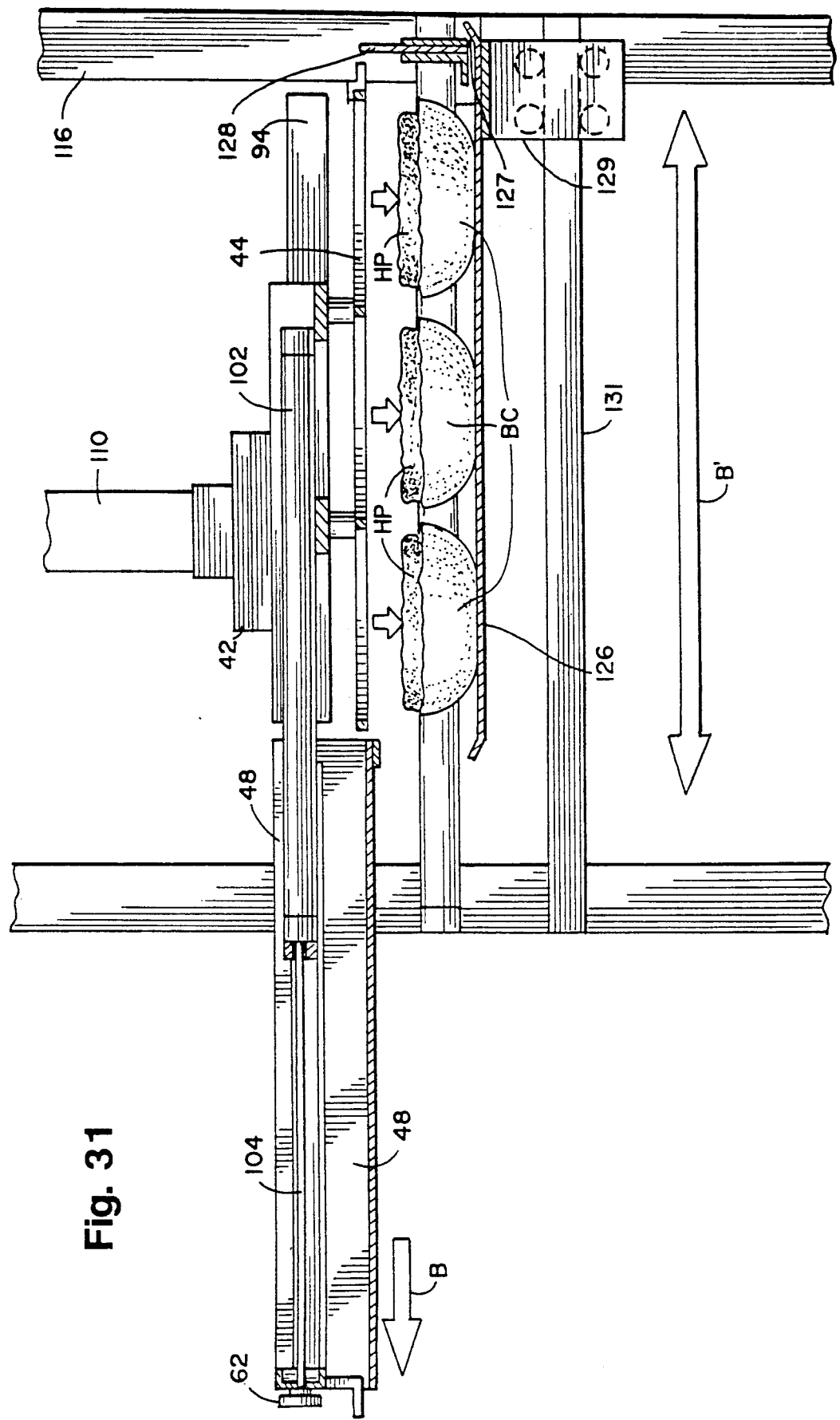

Sandwiches are prepared from cooked patties HP by the steps shown in FIGS. 20-25 and 31. First, while patties HP are cooking on grill 114, a moveable bun tray 126 loaded with bun crowns BC is attached to rack 116 as illustrated in FIG. 20. Bun tray 126 fits into a slot 127 on moveable bun tray frame 129 (part of rack 116) as shown in FIG. 31. Bun tray frame 129 is driven by an air cylinder, not shown, on bun tray track 131 which allows movement of bun tray 126 from an extended position as shown in FIG. 20 to a retracted position under fixture 40 to receive cooked patties HP as shown in FIG. 31. Bun tray 126 can include a cooked patty spatula wiper 128 as illustrated in FIGS. 22 and 23. Fixture 40 then returns to grill 114 with cooked patty spatula 48 extended as shown in FIG. 21, and is lowered to grill 114 as shown in FIG. 22. Spatula 48 is retracted, thereby retrieving cooked patties HP from grill 114. Fixture 40 then returns cooked patties HP to home position H (see FIG. 23) and bun tray 126 is moved under fixture 40 on track 131. This positions crowns BC beneath cooked patties HP and causes wiper 128 to clean the bottom of spatula 48 as tray 126 is moved from the position shown in FIG. 23 to the position shown in FIG. 24. Frame 42 is then extended, which moves cooked patty spatula 48 from beneath hoop 44, causing patties HP to fall on crowns BC as shown in FIGS. 25 and 31. Tray 126 is then extended by movement of bun tray frame 129 along track 131 in the direction of arrow B' in FIG. 31 and bun heels BH are added by a restaurant worker to complete the sandwiches as shown in FIG. 26.

While the invention has been described with respect to the illustrated embodiment, it is to be understood that the invention is capable of numerous changes, modifications and rearrangements without departing from the invention as defined in the following claims.

What is claimed is:

1. A fixture for transferring food objects comprising: first object surrounding means having at least one aperture for horizontally surrounding at least one food object;
  selectively moveable first object support means for supporting the food object beneath the aperture of said first object surrounding means in a support position and moveable relative to the first object surrounding means to a retracted position where said first object support means is withdrawn from beneath the aperture of said first object surrounding means whereby the food object is discharged from the fixture;
  first supporting moving means for selectively moving said first object support means from the retracted position to the support position under said first object surrounding means when said first object surrounding means horizontally surrounds the food object to allow the surrounded object to be released from the fixture when said supporting means is withdrawn from under the aperture of said surrounding means and to allow the object to be retained in the fixture when said support means is moved to the support position under said first object surrounding means;
  second object surrounding means for horizontally surrounding a plurality of food objects and having at least one aperture corresponding to the aperture of said first object surrounding means;
  second object support means selectively moveable relative to said second object surrounding means for performing a second transfer permitting the fixture to selectively retain and discharge the food items horizontally surrounded by the second object surrounding means in cooperation with said second object support means; and
  grippable means for allowing said fixture to be robotically gripped for transporting said fixture between a first and a second food processing location.

2. The fixture of claim 1 wherein said first and said second object surrounding means include a plurality of apertures arranged in horizontal planar array substantially similar to the horizontal planar array of the first object surrounding means for permitting the fixture to discharge items on said second object support means in a horizontal planar array substantially similar to the planar array of apertures of said first surrounding means.

3. The fixture of claim 2 wherein said apertures in said second surrounding means are at least partially vertically coincident with said first apertures for allowing objects deposited from said second support means to be reacquired by said first support means after said second surrounding means has been removed from said fixture.

4. A fixture for transferring food objects comprising:
  a first hoop having at least one aperture for horizontally surrounding at least one food object;
  a selectively moveable first spatula for supporting the food object beneath the aperture of said first hoop in a support position and moveable relative to the first hoop to a retracted position where the first spatula is withdrawn from beneath the aperture of the first hoop whereby the food object is discharged from the fixture;
  an extendable frame for supporting said first hoop and spatula and for moving said first spatula under said first hoop to allow the surrounded food object to be released from the fixture when said spatula is withdrawn from under said hoop to the retracted position and to allow the food object to be retained in the fixture when said spatula is under said hoop in the support position; and
  grippable means for allowing said fixture to be robotically gripped for transporting said fixture between a first and a second food processing location.

5. The fixture of claim 4 wherein said first hoop includes a plurality of first hoop apertures in a horizontal planar array for acquiring or releasing food products in a specific geometric pattern.

6. The fixture of claim 5 which further comprises at least one track for allowing said first spatula to be slidably mounted on said first hoop.

7. The fixture of claim 6 wherein said extendable frame includes at least one moveable arm for sliding said first spatula back and forth on said first hoop.

8. The fixture of claim 5 which further comprises a removably attached second hoop and a second spatula, mounted below said first spatula.

9. A food transfer fixture for transferring a plurality of food items comprising:
  a first hoop having a plurality of first apertures located in a horizontal planar array for horizontally surrounding a plurality of food items;
  a first spatula slidably mounted on said first hoop for selective movement relative to said first hoop and for supporting the plurality of food items beneath said first hoop while horizontally surrounded by said first apertures;
  an extendable frame for supporting said first hoop and for horizontally moving said first spatula under said first hoop to allow the surrounded plurality of objects to be released from the fixture when said spatula is withdrawn from under said hoop and to allow the plurality of objects to be retained in the fixture when said spatula is in position directly under said hoop;
  a removably attached second hoop having a plurality of second hoop apertures for partially horizontally surrounding a plurality of food items; and
  a second spatula slidably mounted on said second hoop for selective movement relative to said second hoop and for supporting beneath said first hoop a plurality of food items horizontally surrounded by said second apertures.

10. The fixture of claim 9 wherein said second apertures are vertically coincident to said first apertures to allow items released from said second apertures in a horizontal planar array to be retrieved by said first apertures.

11. The fixture of claim 10 wherein said second spatula and said second hoop each include at least one latch for allowing said second hoop and said second spatula to be removably attached to said fixture.

12. The fixture of claim 11 wherein said latches are spring fingers.

13. The fixture of claim 12 wherein said extendable frame includes at least one moveable arm for sliding said first spatula a first horizontal distance and at least one additional arm for moving said first spatula an additional horizontal distance.

14. The fixture of claim 10 which further comprises a shuttle for transferring said second hoop and spatula to or from a food item filling station when said second hoop and spatula are detached from said first hoop and spatula.

15. The fixture of claim 14 wherein said shuttle includes a removing mechanism for removing said second hoop and spatula from said first hoop and spatula.

16. A food preparation tool comprising:
a food transporting subassembly having a generally horizontally planar first apertured member with at least two vertically disposed apertures extending through said first apertured member for horizontally surrounding and limiting the horizontal movement of at least two food products in a desired horizontal planar array, said apertured member cooperative with a generally horizontal planar spatula member adapted for sliding movement over a generally planar surface and between the planar surface and food products located on the planar surface and capable of horizontal movement beneath and relative to said at least two apertures between retracted and support positions for allowing two food product located in said horizontal planar array and resting on a generally planar surface to be retrieved by positioning said apertures around a portion of each of said food products and slidably moving said spatula beneath said apertures and said food products and above the generally planar surface from the retracted position to the support position, whereby the food products are retrieved and contained within the food preparation tool.

17. The preparation tool of claim 16 further comprising a second food transport subassembly selectively attachable beneath said first subassembly, said second subassembly including a second generally horizontal spatula, and a second apertured member having at least two apertures slidably cooperative with said second generally horizontal spatula, said second apertured member being in at least partial vertical alignment with said first apertured member.

18. The preparation tool of claim 17 wherein said apertures are round.

19. A moveable fixture for retrieving, containing, transporting and discharging a plurality of food items located on a grill surface comprising:
first surrounding means having a plurality of apertures in a predetermined horizontal array, each aperture for individually horizontally surrounding a different food object and for limiting horizontal movement of the food item during food item retrieval and discharge;
selectively moveable first support means moveable to and from retracted and support positions with respect to the first surrounding means, the first support means being directly beneath the apertures in the support position and horizontally removed from the apertures in the retracted position, the first support means comprising a planar member adapted for sliding movement directly on a grill surface and between the grill surface and food items located on the grill surface in said planar array so that the food items are retrieved from the grill when the apertures of the first surrounding means horizontally surround the food items on the grill surface and the first support means is between the grill surface and the food items located thereon to contain the food items by the fixture, and the food items are discharged from the fixture in said planar array, by horizontally retracting the first support means from the first surrounding means.

20. The moveable fixture of claim 19 further comprising:
second surrounding means having a plurality of second apertures in a predetermined horizontal array, each second aperture for individually horizontally surrounding a different food object and for limiting horizontal movement of the food item during food retrieval and discharge;
selectively moveable second support means moveable to and from retracted and support positions with respect to the second surrounding means, the second support means being directly beneath the apertures in the support position horizontally removed from the apertures in the retracted position, the second support means comprising a planar member adapted for sliding movement directly on a grill surface and between the grill surface and food items located on the grill surface in said planar array so that food items are deposited on the grill when the apertures of the second surrounding means horizontally surround the food items and the second support means moves from the support position to the retracted position by sliding the second support means from beneath the food items horizontally surrounded by said second surrounding means.

21. The moveable fixture of claim 20 wherein said second surrounding means and said second moveable support means are removably attached beneath said first surrounding means and first moveable support means.

22. The moveable fixture of claim 21 wherein said second apertures are in substantial vertical alignment with said first apertures.

23. A fixture for transferring food objects comprising:
first object surrounding means having at least one aperture for horizontally surrounding at least one food object;
selectively moveable first object support means for supporting the food object beneath the aperture of said first object surrounding means in a support position and moveable relative to the first object surrounding means to a retracted position where said first object support means is withdrawn from beneath the aperture of said first object surrounding means whereby the food object is discharged from the fixture;
support moving means for selectively moving said first object support means from the retracted position to the support position under said first object surrounding means when said first object surrounding means horizontally surrounds the food object located on the grill support means to allow the surrounded object to be released from the fixture when said supporting means is withdrawn from under the aperture of said surrounding means and to allow the object to be retained in the fixture when said support means is moved to a support position under said first object surrounding means;

arm means including first moveable arm means for moving said support means a first distance relative to said surrounding means and second moveable arm means for moving said support means an additional second distance relative to said surrounding means; and grippable means for allowing said fixture to be robotically gripped for transporting said fixture between a first and a second food processing location.

24. A fixture for transferring food objects comprising:

first object surrounding means having a plurality of apertures for horizontally surrounding a plurality of food objects;

selectively moveable first object support means for supporting the food objects beneath the apertures of said first object surrounding means in a support position and moveable relative to the first object surrounding means to a retracted position where said first object support means is withdrawn from beneath the apertures of said first object surrounding means whereby the food objects are discharged from the fixture;

support moving means for selectively moving said first object support means from the retracted position to the support position under said first object surrounding means when said first object surrounding means horizontally surrounds the food objects located on the grill to allow the surrounded objects to be released from the fixture when said supporting means is withdrawn from under the apertures of said first object surrounding means and to allow the objects to be retained in the fixture when said support means is moved to a support position under said first object surrounding means;

second surrounding means having a plurality of second apertures in a predetermined horizontal array for individually horizontally surrounding food objects and for limiting horizontal movement of the food objects during food retrieval and discharge;

selectively moveable second support means moveable to and from retracted and support positions with respect to the second surrounding means, the second support means being directly beneath the apertures in the second support means and comprising a planar member adapted for sliding movement directly on a grill surface and between the grill surface and food items located on the grill surface in said planar array so that food items are deposited on the grill when the apertures of the second surrounding means horizontally surround the food items in the second support means moves from the support position to the retracted position;

said second apertures being at least partially vertically coincident with said first apertures for allowing objects deposited from said second support means to be reacquired by said first support means after said second surrounding means has been removed from said fixture; and grippable means for allowing said fixture to be robotically gripped for transporting said fixture between a first and a second food processing location.

25. The fixture of claim 24 wherein said second surrounding means includes coupling means for allowing said second surrounding means to be removably attached to said first surrounding means below said first surrounding means.

26. The fixture of claim 25 which further comprises slidable mounting means for allowing said first object support means to be slidably mounted to said first object surrounding means and for allowing said second object support means to be slidably mounted to said second object surrounding means.

27. The fixture of claim 26 wherein said coupling means includes second support coupling means for making said second support means move when said first support means is moved.

28. The fixture of claim 27 wherein said spatula moving means includes at least one moveable arm means for sliding said first object support means back and forth relative to said first object surrounding means and for sliding said second object support means back and forth relative to said second object surrounding means.

29. The fixture of claim 25 further comprising a release means for allowing said second support means and said second surrounding means to be detached from said fixture.

30. The fixture of claim 28 further comprising a release means for allowing said second support means and second surrounding means to be detached from said fixture.

31. A fixture for transferring food objects comprising:

a first hoop having at least one aperture for horizontally surrounding at least one food object;

a selectively moveable first spatula for supporting the food object beneath the aperture of said first hoop n a support position and moveable relative to the first hoop to a retracted position where the first spatula is withdrawn from beneath the aperture of the first hoop whereby the food object is discharged from the fixture;

an extendable frame for supporting said first hoop and spatula and for moving said first spatula under said first hoop to allow the surrounded food object to be released from the fixture when said spatula is withdrawn from under said hoop to the retracted position and to allow the food object to be retained in the fixture when said spatula is under said hoop in the support position, said extendable frame including at least one moveable arm for sliding said first spatula back and forth on said hoop; and grippable means for allowing said fixture to be robotically gripped for transporting said fixture between a first and a second food processing location.

32. The fixture of claim 31 further comprising a removably attached second hoop and a second spatula mounted below said first spatula, wherein said second spatula includes at least one latch for allowing said second hoop and said second spatula to be removably attached to said fixture.

33. The fixture of claim 32 wherein said second hoop includes a plurality of second hoop apertures corresponding in number to the first hoop apertures and at least partially vertically aligned with said first hoop apertures for permitting the fixture to retrieve objects deposited by the withdrawal of said second spatula from under said second hoop in said horizontal planar array when said first spatula is moved to said support position and said first hoop apertures surround the objects and after said second hoop and said second spatula have been removed from said fixture.

34. The fixture of claim 33 wherein said first spatula includes at least a first track for allowing said first spatula to be slidably mounted on said first hoop and wherein said second spatula includes at least a second track for allowing said second spatula to be slidably mounted on said second hoop.

35. The utensil of claim 32 wherein said extendable frame includes at least one moveable arm for moving said first and second spatulas horizontally back and forth relative to said first and second hoops.

36. The utensil of claim 33 which further comprises a latch releasing frame for releasing said latches when said second hoop is resting on said releasing frame.

* * * * *